United States Patent
Leng et al.

(10) Patent No.: US 11,812,444 B2
(45) Date of Patent: Nov. 7, 2023

(54) RESOURCE SCHEDULING BETWEEN NETWORK NODES

(71) Applicant: NOKIA TECHNOLOGIES OY, Espoo (FI)

(72) Inventors: Xiaobing Leng, Shanghai (CN); Dongyao Wang, Shanghai (CN); Dawei Wang, Shanghai (CN); Junrong Gu, Shanghai (CN); Gang Shen, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 255 days.

(21) Appl. No.: 17/265,452

(22) PCT Filed: Aug. 3, 2018

(86) PCT No.: PCT/CN2018/098657
§ 371 (c)(1),
(2) Date: Feb. 2, 2021

(87) PCT Pub. No.: WO2020/024288
PCT Pub. Date: Feb. 6, 2020

(65) Prior Publication Data
US 2021/0321395 A1      Oct. 14, 2021

(51) Int. Cl.
*H04W 72/27*     (2023.01)
*H04W 72/02*     (2009.01)
(Continued)

(52) U.S. Cl.
CPC ........... *H04W 72/27* (2023.01); *H04W 72/02* (2013.01); *H04W 72/1263* (2013.01); *H04W 72/52* (2023.01)

(58) Field of Classification Search
None
See application file for complete search history.

(56) References Cited

U.S. PATENT DOCUMENTS

| 10,921,948 | B1* | 2/2021 | Caballero | H04L 65/762 |
| 2015/0110060 | A1* | 4/2015 | Yan | H04W 72/535 |
| | | | | 370/329 |

(Continued)

FOREIGN PATENT DOCUMENTS

| CN | 102215577 A | 10/2011 |
| CN | 103002467 A | 3/2013 |

(Continued)

OTHER PUBLICATIONS

International Search Report and Written Opinion dated Apr. 15, 2019 corresponding to International Patent Application No. PCT/CN2018/098657.

(Continued)

*Primary Examiner* — Phirin Sam
(74) *Attorney, Agent, or Firm* — SQUIRE PATTON BOGGS (US) LLP

(57) ABSTRACT

Embodiments of the present disclosure relate to resource scheduling between network nodes. In example embodiments, a method comprises allocating, at a first network node, a first set of resources from a first resource pool for backhaul communication with a second network node in a network via a first link, the first resource pool comprising uplink and downlink resources shared with a first terminal device served by the first network node; transmitting a first indication of the first set of resources to the second network node; and receiving a second indication of a second set of resources from a second resource pool for the backhaul communication with the second network node via a second link, the second resource pool comprising uplink and downlink resources shared with a second terminal device served by the second network node. In this way, it is possible to achieve flexible resource scheduling among the network nodes.

33 Claims, 12 Drawing Sheets

(51) Int. Cl.
*H04W 72/1263* (2023.01)
*H04W 72/52* (2023.01)

(56) References Cited

U.S. PATENT DOCUMENTS

| | | |
|---|---|---|
| 2015/0373672 A1 | 12/2015 | Forssell |
| 2017/0325277 A1* | 11/2017 | Fujishiro ................. H04W 4/06 |
| 2018/0070335 A1* | 3/2018 | Amuru ................... H04L 5/0091 |
| 2018/0139599 A1* | 5/2018 | Yasukawa ............. H04W 8/005 |
| 2018/0192445 A1* | 7/2018 | Jiang ................. H04W 72/0466 |
| 2018/0206196 A1* | 7/2018 | Wang .................. H04W 52/325 |
| 2019/0182826 A1* | 6/2019 | Yerramalli ............ H04W 72/20 |
| 2019/0182875 A1* | 6/2019 | Talebi Fard ............ H04W 8/18 |
| 2019/0261184 A1* | 8/2019 | Xu .......................... H04L 67/12 |
| 2019/0261278 A1* | 8/2019 | Gupta ................... H04L 5/0035 |
| 2019/0313433 A1* | 10/2019 | Abedini ............ H04W 72/0446 |
| 2020/0221543 A1* | 7/2020 | Wei ....................... H04W 88/04 |
| 2020/0288482 A1* | 9/2020 | Yi ......................... H04W 72/23 |

FOREIGN PATENT DOCUMENTS

| | | |
|---|---|---|
| CN | 103392375 A | 11/2013 |
| CN | 104507167 A | 4/2015 |
| CN | 105451271 A | 3/2016 |
| CN | 106165469 A | 11/2016 |
| CN | 107113871 A | 8/2017 |
| CN | 107211408 A | 9/2017 |
| CN | 107615846 A | 1/2018 |
| WO | WO 2013/043577 A2 | 3/2013 |
| WO | 2016/131167 A1 | 8/2016 |
| WO | WO 2018/096472 A1 | 5/2018 |

OTHER PUBLICATIONS

Extended European Search Report dated Feb. 21, 2022 corresponding to European Patent Application No. 18928214.8.
Intel Corporation, "Overview on RAN1 related issues in IAB," 3GPP Draft; R1-1804755, 3GPP TSG RAN WG1 #92bis, Apr. 16-20, 2018, Sanya, China, Apr. 7, 2018, XP051414119.
Vivo, "Discussion on IAB node access and resource allocation," 3GPP Draft, R2-1809864, 3GPP TSG-RAN WG2 NR AH1807 Meeting, Montreal, Canada, Jul. 2-6, 2018, Jul. 2, 2018, XP051467109.
Chinese Office Action issued in corresponding Chinese Patent Application No. 201880098400.7 dated Jul. 6, 2023.

* cited by examiner

RESOURCE SCHEDULING BETWEEN NETWORK NODES

FIELD

Embodiments of the present disclosure generally relate to the field of telecommunication and in particular, to resource scheduling between network nodes.

BACKGROUND

Data networking traffic has grown at approximately 100% per year for over 20 years and continues to grow at this pace. Only transport over optical fiber has shown the ability to keep pace with this ever-increasing data networking demand for core data networks. While deployment of optical fiber to an edge of the core data network would be advantageous from a network performance perspective, it is often impractical to connect all high bandwidth data networking points with optical fiber at all times. Instead, connections to remote edge access networks from core networks are often achieved with wireless radio, wireless infrared, and/or copper wireline technologies.

Radio, especially in the form of cellular or wireless local area network (WLAN) technologies, is particularly advantageous for supporting mobility of data networking devices. However, cellular base stations or WLAN access points inevitably become very high data bandwidth demand points that require continuous connectivity to an optical fiber core network. When data aggregation points, such as cellular base station sites, WLAN access points, or other local area network (LAN) gateways, cannot be directly connected to a core optical fiber network, then an alternative connection, using, for example, wireless radio or copper wireline technologies, must be used. Such connections are commonly referred to as "backhaul." The communication over the backhaul link requires resources to support.

SUMMARY

In general, example embodiments of the present disclosure provide a solution for resource scheduling between network nodes.

In a first aspect, there is provided a device. The device comprises at least one processor; and at least one memory including computer program codes; the at least one memory and the computer program codes are configured to, with the at least one processor, cause the device at least to: at a first network node, allocate a first set of resources from a first resource pool for backhaul communication with a second network node in a network via a first link, the first resource pool comprising uplink and downlink resources shared with a first terminal device served by the first network node; transmit a first indication of the first set of resources to the second network node; and receive, from the second network node, a second indication of a second set of resources for the backhaul communication with the second network node via a second link, the second set of resources being selected from a second resource pool, and the second resource pool comprising uplink and downlink resources shared with a second terminal device served by the second network node.

In a second aspect, there is provided an apparatus for scheduling resources. The apparatus comprises means for, at a first network node, allocating a first set of resources from a first resource pool for backhaul communication with a second network node in a network via a first link, the first resource pool comprising uplink and downlink resources shared with a first terminal device served by the first network node; means for transmitting a first indication of the first set of resources to the second network node; and means for receiving, from the second network node, a second indication of a second set of resources for the backhaul communication with the second network node via a second link, the second set of resources being selected from a second resource pool, and the second resource pool comprising uplink and downlink resources shared with a second terminal device served by the second network node.

In a third aspect, there is provided a method of scheduling resources. The method comprises at a first network node, allocating a first set of resources from a first resource pool for backhaul communication with a second network node in a network via a first link, the first resource pool comprising uplink and downlink resources shared with a first terminal device served by the first network node; transmitting a first indication of the first set of resources to the second network node; and receiving, from the second network node, a second indication of a second set of resources for the backhaul communication with the second network node via a second link, the second set of resources being selected from a second resource pool, and the second resource pool comprising uplink and downlink resources shared with a second terminal device served by the second network node.

In a fourth aspect, there is provided a non-transitory computer readable medium comprising program instructions for causing an apparatus to perform at least the following: at a first network node, allocating a first set of resources from a first resource pool for backhaul communication with a second network node in a network via a first link, the first resource pool comprising uplink and downlink resources shared with a first terminal device served by the first network node; transmitting a first indication of the first set of resources to the second network node; and receiving, from the second network node, a second indication of a second set of resources for the backhaul communication with the second network node via a second link, the second set of resources being selected from a second resource pool, and the second resource pool comprising uplink and downlink resources shared with a second terminal device served by the second network node.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
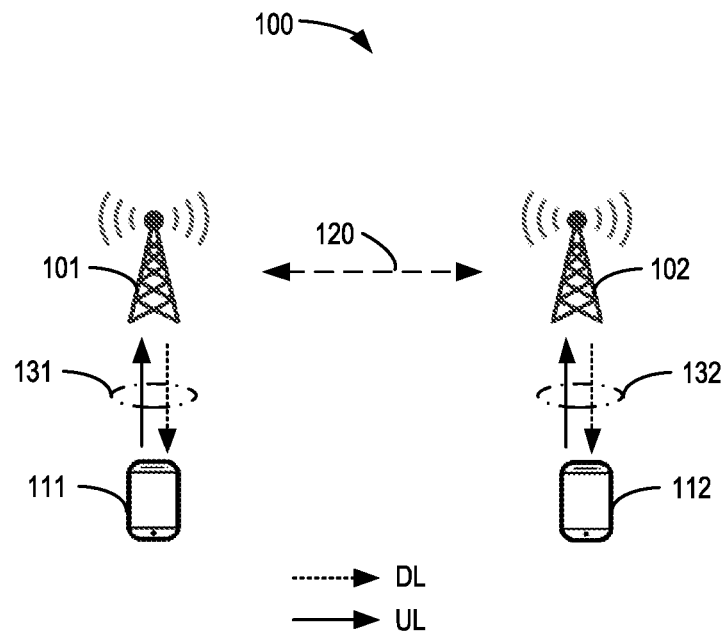
FIG. 1 illustrates a schematic diagram of an example wireless communication network in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "wireless communication network" refers to a network following any suitable wireless communication standards, such as New Radio (NR), Long Term Evolution (LTE), LTE-Advanced (LTE-A), Wideband Code Division Multiple Access (WCDMA), High-Speed Packet Access (HSPA), and so on. The "wireless communication network" may also be referred to as a "wireless communication system." Furthermore, communications between network devices, between a network device and a terminal device, or between terminal devices in the wireless communication network may be performed according to any suitable communication protocol, including, but not limited to, Global System for Mobile Communications (GSM), Universal Mobile Telecommunications System (UMTS), Long Term Evolution (LTE), New Radio (NR), wireless local area network (WLAN) standards, such as the IEEE 802.11 standards, and/or any other appropriate wireless communication standard either currently known or to be developed in the future.

As used herein, the term "network node" or "network device" refers to a node in a wireless communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaining terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "communication device", "terminal", "user equipment" and "UE" may be used interchangeably.

As yet another example, in an Internet of Things (JOT) scenario, a terminal device may represent a machine or other device that performs monitoring and/or measurement, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

FIG. 1 illustrates an example wireless communication network 100 in which embodiments of the present disclosure may be implemented. As shown, the communication network 100 includes one or more network nodes, for example, network nodes 101 and 102, and one or more terminal devices (or UEs) 111 and 112. The terminal device 111 is served by the network node 101 while the terminal device 112 is served by the network node 102. It would be appreciated that for each network node, one terminal device is shown for purpose of illustration only and additional terminal devices may connected to and served by the network node in practiced applications. It would also be appreciated that one or more network nodes and their terminal devices may be included in the communication network 100.

The two network nodes 101 and 102 are adjacent nodes in a backhaul path in the network. Depending on the locations of the network nodes 101 and 102 relative to a fiber network, one of the network nodes 101 may be identified as an upstream node, while the other one may be identified as a downstream node. As used herein, the upstream node is an anchor node or the node near to an anchor node with respect to another node. The anchor node is a network node having a direct connection to the fiber network. The downstream node is a node connected to the anchor node or is far to an anchor node with respect to another node. For an intermediate node at a multi-hop backhaul path, it is a downstream node with respect to its upstream node and is also an upstream node with respect to its downstream node.

In operation, the terminal device 111 can establish an access link 131 with the network node 101. Information can be communicated between the network node 101 and the terminal device 111 via the access link 131. The network node 101 may transmit information to the terminal device 111 in downlink and receive information from the terminal device 111 in uplink over the access link 131. Similarly, the terminal device 112 can also establish an access link 132 with the network node 102 for information communication therebetween in both downlink and uplink. In addition, a backhaul link 120 can be established between the network nodes 101 and 102 to exchange information therebetween. The communication between a network node and a terminal device may be referred to as radio access communication, while the communication between two network nodes may be referred to as backhaul communication.

Wireless backhaul enables rapid, low-cost and very dense wireless network deployment. Current and future radio access communication adopts various technologies such as massive MIMO and multi-bean technologies over large bandwidth mmWave spectrum. Thus, it has been proposed that backhaul communication can share radio access resources and also adopt those technologies defined for radio access technologies.

Typically, uplink and downlink radio resources are scheduled to support the access communication. The backhaul communication shares radio resources with the access communication, which is thus referred to as in-band backhaul communication. In conventional resource mechanism, the backhaul communication always shares radio resources of the upstream node. The backhaul link often has special channels and procedure operations, resulting in high complexity implementation and increase network node cost. The conventional mechanism of sharing resources of the uplink stream node only thus lacks sufficient flexibility and may lead to various issues in many cases. For example, when there is heavy load in the access communication of the upstream node, there may be critical shortage of resources in either the access communication or the backhaul communication. In some cases, only the resources of the upstream node may not be sufficient to support high performance requirement on the backhaul communication.

According to embodiments of the present disclosure, there is proposed a resource scheduling solution for network nodes. In the solution of the present disclosure, each of two network nodes schedules resources, which are shared with their terminal devices for access communication, for backhaul communication between the two network nodes. In this way, it is possible to efficiently share radio resources with adjacent network nodes, thereby achieving high spectrum efficiency and high quality of service (QoS) in backhaul communication.

Figure 2:
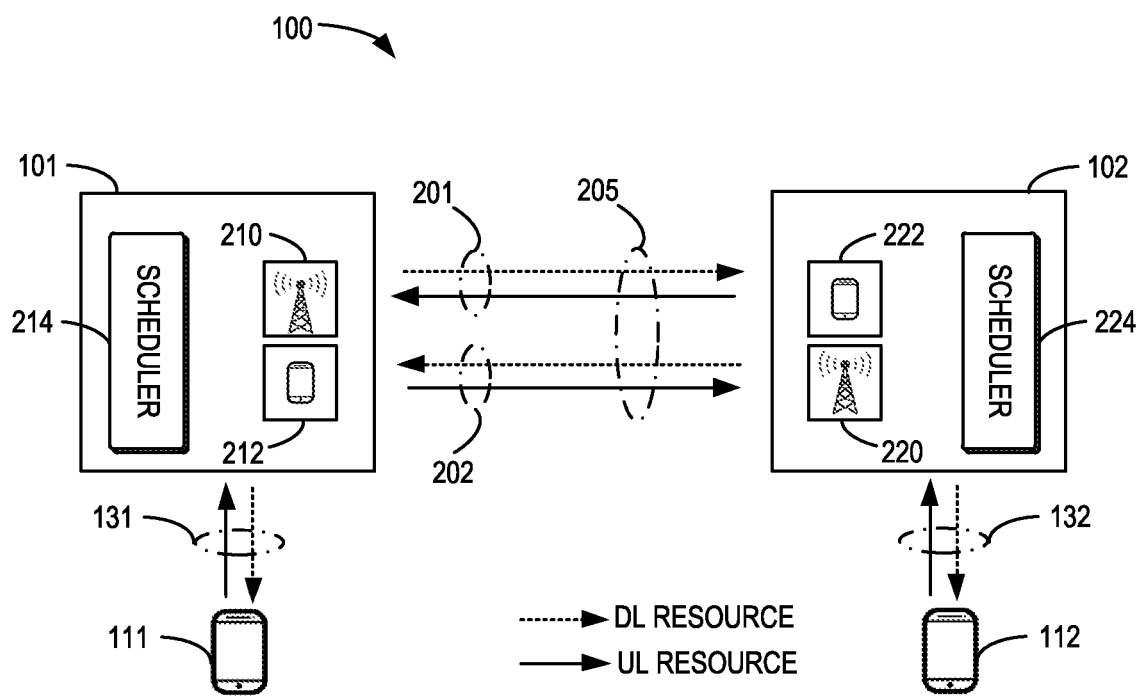
FIG. 2 illustrates a schematic diagram of an wireless communication network showing resource scheduling between two network nodes according to embodiments of the present disclosure.

To better understand the resource scheduling solution, reference can be made to FIG. 2, which illustrates a schematic diagram showing resource scheduling between two network nodes 101 and 102 in the network 100 of FIG. 1. As shown in FIG. 2, the backhaul link 205 between the network nodes 101 and 102 are established as a dual backhaul link, including a link 201 and a link 202. Backhaul communication between the network nodes 101 and 102 can be performed over the dual backhaul link 205 using corresponding scheduled resources.

The network node 101 allocates a set of resources from a resource pool for backhaul communication with the network node 102 via the link 201, and the network node 102 allocates a set of resources from a resource pool for backhaul communication with the network node 102 via the link 202. The resource pool from which the network node 101 allocates resources for the link 201 may include uplink and downlink resources shared with one or more terminal devices served by the network node 101 (such as the terminal device 111 shown in FIG. 2). That is to say, radio resources for the access communication between the network node 101 and its served terminal devices can be shared with the backhaul communication. Similarly, the resource pool from which the network node 102 allocates resources for the link 202 may include uplink and downlink resources shared with one or more terminal devices served by the network node 102 (such as the terminal device 112 shown in FIG. 2). Thus, radio resources for the access communication between the network node 102 and its served terminal devices can also be shared with the backhaul communication. In embodiments of the present disclosure, the resources to be allocated/scheduled by the network node 101 or 102 may be any radio access resources that are utilized in the access communication, example of which may include time resources, frequency resources, and/or code resources utilized in time division duplex (TDD) access communication, frequency division duplex (FDD) access communication, and/or code division multiple access communication.

In embodiments of the present disclosure, communication over the link 201 is controlled by the network node 101 and communication over the link 202 is controlled and scheduled by the network node 102. The links 201 and 202 of the dual backhaul link 205 each consist of two inverse links and are compatible with normal access links, such as the links 131 and 132. Backhaul traffic in both directions between the network nodes 201 and 202 can be carried over the links 201 and 202. The two links 201 and 202 makes each of the networks nodes 101 and 102 acts as two roles, a network node (B S) and a terminal device (or UE). In particular, over the link 201, the network node 101 acts as a BS while the network node 102 acts as an UE of the network node 101. Over the link 202, the network node 102 acts as a BS while the network node 101 acts as its UE.

The network nodes 101 and 102 include respective schedulers 214 and 224 for scheduling the sets of resources for the backhaul communication. The network nodes 101 and 102 transmit indications of the scheduled sets of resources to the counterpart network nodes 102 and 101. Upon receiving the indication, the network node may be able to use the set of resources scheduled by itself and the set of the set of resources scheduled by the other network node.

Further, the network nodes 101 and 102 each include corresponding modules to support the functionalities of the two different roles. As illustrated, the network node 101 includes a BS module 210 for backhaul communication with the network node 102 over the link 201, and an UE module 212 for backhaul communication with the network node 102 over the link 202. Similarly, the network node 102 also includes a BS module 220 for backhaul communication with the network node 101 over the link 202 and an UE module 222 for backhaul communication with the network node 101 over the link 201.

In some embodiments, when sharing the resources for the access communication with the terminal devices, the links 201 and 202 may reuse all channels and procedures definitions for the radio access of the network nodes 101 and 102. As such, the dual backhaul links 205 consisting of the links 201 and 202 can be established via access links that are currently used or emerging in the future, such as 4G or 5G access technologies.

In some embodiments, the UE modules 212 and 222 in the network nodes 101 and 102 can be identified by unique identities (IDs). During the deployment of the backhaul network, the UE modules 212 and 222 may be configured as backhaul UEs to attach to special adjacent network nodes for backhaul communication. At the same time, the BS modules 210 and 220 may be configured to identify these backhaul UEs. Based on the configurations, the adjacent network nodes 101 and 102 can establish the dual backhaul link 205. In some embodiments, the two links 201 and 202 of the dual backhaul link 205 may be allocated minimum bandwidth for union scheduling information exchanged between two network nodes 101 and 102.

In embodiments of the present disclosure, the network nodes 101 and 102 may utilize a union resource scheduling mechanism to negotiate with each other and decide the resource allocation for the links 201 and 202. In the union resource scheduling, one of the network nodes 101 and 102 may act as a master node for controlling resource scheduling between the network nodes 101 and 102, and the other one may act as a slave node. In some embodiments, one of the network nodes 101 and 102 may act as a master node for controlling scheduling of uplink or downlink resources only, and the other one may act as a master node for controlling scheduling of resources in the reverse direction. The scheduler in the master node may be referred to as a master scheduler, and the scheduler in the slave node may be referred to as a slave scheduler. The slave scheduler may schedule its uplink or downlink resources for the backhaul communication under the control of the master scheduler.

In some embodiments, the uplink and/or downlink resources scheduled by the master node may be prioritized over the uplink and/or downlink resources scheduled by the slave node in use for the backhaul communication. In addition, a communication link from an upstream node to a downstream node may be referred to as backhaul downlink (BH DL), and a communication link from the downstream node to the upstream node may be referred to as backhaul uplink (BH UL). Both the uplink and downlink access resources can be used for BH DL communication. In addition, both the uplink and downlink access resources can be used for BH UL communication.

Depending on which one of the network nodes 101 and 102 is the master node for controlling uplink and/or downlink resource scheduling, the union resource scheduling between the network nodes 101 and 102 may have four different modes. The four different modes are illustrated in FIGS. 3A-3D, which will be described below. For convenience of illustration and discussion, in the examples shown in FIGS. 3A-3D, the network node 101 is illustrated as an upstream node and the network node 102 is illustrated as a downstream node. However, it would be appreciated that in a backhaul path, the network node 101 may also be an upstream node, and the network node 102 may then be the upstream node. The terminal devices and their access links are omitted in these figures for brevity.

Figure 3A:
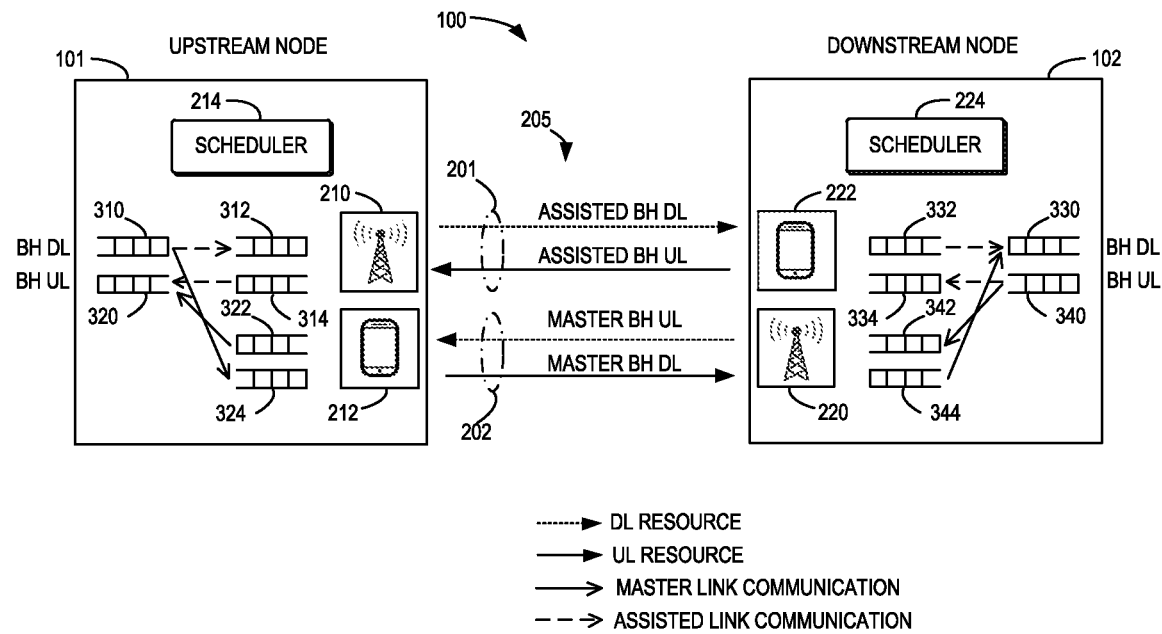
FIGS. 3A-3D illustrate schematic diagrams of different modes for resource scheduling in the wireless communication network of FIG. 2 according to embodiments of the present disclosure.

FIG. 3A shows a first mode (Mode 1) for the union resource scheduling between the nodes 101 and 102. In this mode, the downstream node 102 acts as a master node for resource scheduling for BH UL and DL communication while the upstream node 101 acts as a slave node. The downstream node 102 (for example, its scheduler 224) allocates its own access uplink and downlink resources as a set of resources for BH UL and DL communication, which may also be referred to as master uplink and downlink resources in this mode. The set of the allocated resources may be indicated to the upstream node 101 via an indication. Thus, over the link 202 controlled by the downstream node 102, a BH UL in a direction from the downstream node 102 to the upstream node 101 may be referred to as a master BH UL, which has the downlink resource scheduled by the downstream node 102 for BH UL communication. In addition, a BH DL in a direction from the upstream node 101 to the downstream node 102 over the link 202 may be referred to as a master BH DL, which has the uplink resource scheduled by the downstream node 102 for BH DL communication.

In operation, the downstream node 102 (for example, its scheduler 224) determines whether the master uplink and/or downlink resources are sufficient for the backhaul communication. If the downstream node 102 determines that its scheduled resources are insufficient for the backhaul communication (which means that a resource shortage happens), the downstream node 102 may transmit a request for resource allocation to the upstream node 101. Upon receiving the request, the upstream node 101 (for example, its scheduler 214) may allocate a set of resources and transmit an indication of the set of allocated resources to the downstream node 102. The set of resources scheduled by the upstream node 101 may be used as assisted resources for the backhaul communication over the link 201, which include uplink and/or downlink resources scheduled from the resource pool for access communication of this node. Over the link 201, a BH DL in a direction from the upstream node 101 to the downstream node 102 may be referred to as an assisted BH DL, which has the downlink resources scheduled by the upstream node 101 for BH DL communication. In addition, a BH UL in a direction from the downstream node 102 to the upstream node 101 over the link 101 may be referred to as an assisted BH UL, which has the uplink resources scheduled by the upstream node 101 for BH UL communication.

According to the embodiments of FIG. 3A, the link 202 using the master resources may be referred to as a master link and the link 201 using the assisted resources may be referred to as an assisted link. FIG. 3A further shows how backhaul traffic buffered in the upstream node 101 and the downstream node 102 can be communicated using the master link and the assisted link. In the upstream node 101, a BH DL buffer 310 stores BH DL traffic to be transmitted to the downstream node 102 in BH DL, and a BH UL buffer 320 stores BH UL traffic received from the downstream node 102 in BH UL. In the downstream node 102, a BH DL buffer 330 stores BH DL traffic received from the upstream node 101 in BH DL, and a BH UL buffer 340 stores BH UL traffic to be transmitted to the upstream node 101 in BH UL.

In BH DL communication at the side of the upstream node 101, the BH DL traffic in the buffer 310 may be scheduled, for example, by the scheduler 214 (or another scheduler or controller in the node 101 responsible for traffic scheduling), to a BH DL buffer 324 associated with the UE module 212. The UE module 212 may transmit the BH DL traffic in the buffer 324 to the downstream node 102 using the master resources over the master link 202. In case of the assisted resources are scheduled by the upstream node 101, part or all of the BH DL traffic in the buffer 310 may be scheduled to a BH DL buffer 312 associated with the BS module 210. The BS module 212 may transmit the BH DL traffic in the buffer 312 to the downstream node 102 using the assisted resources over the assisted link 201.

In BH UL communication at the side of the upstream node 101, the UE module 212 may receive the BH UL traffic transmitted from the downstream node 102 using the master resources over the master link 202. The BH UL traffic is buffered in a BH UL buffer 322 associated with the UE module 212 and provided to the BH UL buffer 320. In case of the assisted resources are scheduled by the upstream node 101, part or all of the BH UL traffic may be received by the BS module 210 from the downstream node 102 using the assisted resource over the assisted link 201. The BH UL traffic is buffered in a BH UL buffer 314 associated with the BS module 210 and provided to the BH UL buffer 320.

In BH DL communication at the side of the downstream node 102, the BS module 220 may receive the BH DL traffic transmitted from the upstream node 101 using the master resources over the master link 202. The BH DL traffic is buffered in a BH DL buffer 344 associated with the BS module 220 and provided to the BH DL buffer 330. In case of the assisted resources are scheduled by the upstream node 101, part or all of the BH DL traffic may be received by the UE module 222 from the upstream node 101 using the assisted resources over the assisted link 201. The BH DL traffic is buffered in a BH DL buffer 332 associated the UE module 222 and provided to the BH DL buffer 330.

In BH UL communication at the side of the downstream node 102, the BH UL traffic in the buffer 340 may be scheduled, for example, by the scheduler 224 (or another scheduler or controller in the node 102 responsible for traffic scheduling), to a BH UL buffer 342 associated with the BS module 220. The BS module 220 may transmit the BH UL traffic in the buffer 342 to the upstream node 101 using the master resources over the master link 202. In case of the assisted resources are scheduled by the upstream node 101, part or all of the BH UL traffic may be scheduled to a buffer BH UL buffer 334 associated with the UE module 222. The UE module 222 may transmit the BH UL traffic in the buffer 334 to the upstream node 101 using the assisted resources over the assisted link 201.

Figure 3B:
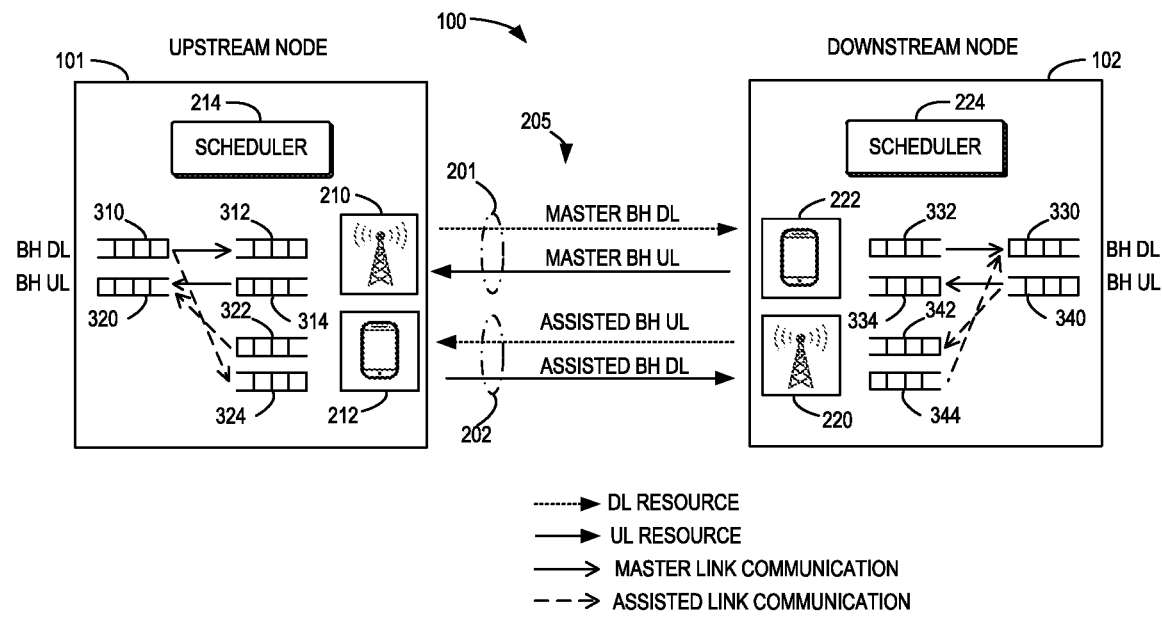

FIG. 3B shows a second mode (Mode 2) for the union resource scheduling between the nodes 101 and 102. In this mode, the upstream node 101 acts as a master node for resource scheduling for BH UL and DL communication while the downstream node 102 acts as a slave node. The upstream node 101 (for example, its scheduler 214) allocates its own access uplink and downlink resources as a set of resources for BH UL and DL communication, which may also be referred to as master uplink and downlink resources in this mode. The set of the allocated resources may be indicated to the downstream node 102 via an indication. Thus, over the link 201 controlled by the upstream node 101, a BH UL in a direction from the downstream node 102 to the upstream node 101 may be referred to as a master BH UL, which has the uplink resource scheduled by the upstream node 101 for BH UL communication. In addition, a BH DL in a direction from the upstream node 101 to the downstream node 102 over the link 201 may be referred to as a master BH DL, which has the downlink resource scheduled by the upstream node 101 for BH DL communication.

In operation, the upstream node 101 (for example, its scheduler 214) determines whether the master uplink and/or downlink resources are sufficient for the backhaul communication. If the upstream node 101 determines that its scheduled resources are insufficient for the backhaul communication (which means that a resource shortage happens), the upstream node 101 may transmit a request for resource allocation to the downstream node 102. Upon receiving the request, the downstream node 102 (for example, its scheduler 224) may allocate a set of resources and transmit an indication of the set of allocated resources to the upstream node 101. The resources scheduled by the downstream node 102 may be used as assisted resources for the backhaul communication over the link 202 which include uplink and/or downlink resources scheduled from the resource pool for access communication of this node. Over the link 202, a BH DL in a direction from the upstream node 101 to the downstream node 102 may be referred to as an assisted BH DL, which has the downlink resources scheduled by the downstream node 102 for BH DL communication. In addition, a BH UL in a direction from the downstream node 102 to the upstream node 101 over the link 102 may be referred to as an assisted BH UL, which has the uplink resources scheduled by the downstream node 102 for BH UL communication.

According to the embodiments of FIG. 3B, the link 201 using the master resources may be referred to as a master link and the link 202 using the assisted resources may be referred to as an assisted link. FIG. 3B further shows how backhaul traffic buffered in BH DL buffers and BH UL buffers of the upstream node 101 and the downstream node 102 can be communicated using the master link and the assisted link.

In BH DL communication at the side of the upstream node 101, the BH DL traffic in the buffer 310 may be scheduled, for example, by the scheduler 214 (or another scheduler or controller in the node 101 responsible for traffic scheduling), to the BH DL buffer 312 associated with the BS module 210. The BS module 210 may transmit the BH DL traffic in the buffer 312 to the downstream node 102 using the master resources over the master link 201. In case of the assisted resources are scheduled by the downstream node 102, part or all of the BH DL traffic in the buffer 310 may be scheduled to the BH DL buffer 324 associated with the UE module 212. The UE module 212 may transmit the BH DL traffic in the buffer 324 to the downstream node 102 using the assisted resources over the assisted link.

In BH UL communication at the side of the upstream node 101, the BS module 210 may receive the BH UL traffic transmitted from the downstream node 102 using the master resources over the master link 201. The BH UL traffic is buffered in the BH UL buffer 314 associated with the BS module 210 and provided to the BH UL buffer 320. In case of the assisted resources are scheduled by the downstream node 102, part or all of the BH UL traffic may be received by the UE module 212 from the downstream node 102 using the assisted resource over the assisted link 202. The BH UL traffic is buffered in the BH UL buffer 322 and provided to the BH UL buffer 320.

In BH DL communication at the side of the downstream node 102, the UE module 222 may receive the BH DL traffic transmitted from the upstream node 101 using the master resources over the master link 201. The BH DL traffic is buffered in the BH DL buffer 332 and provided to the BH DL buffer 330. In case of the assisted resources are scheduled by the downstream node 102, part or all of the BH DL traffic may be received by the BS module 220 from the upstream node 101 using the assisted resources over the assisted link 202. The BH DL traffic is buffered in the BH DL buffer 344 associated with the BS module 220 and provided to the BH DL buffer 330.

In BH UL communication at the side of the downstream node 102, the BH UL traffic in the buffer 340 may be scheduled, for example, by the scheduler 224 (or another scheduler or controller in the node 102 responsible for traffic scheduling), to the BH UL buffer 334 associated with the UE module 222. The UE module 222 may transmit the BH UL traffic in the buffer 334 to the upstream node 101 using the master resources over the master link 201. In case of the assisted resources are scheduled by the downstream node 102, part or all of the BH UL traffic may be scheduled to the buffer BH UL buffer 344 associated with the BS module 220. The BS module 220 may transmit the BH UL traffic in the buffer 344 to the upstream node 101 using the assisted resources over the assisted link 202.

Figure 3C:
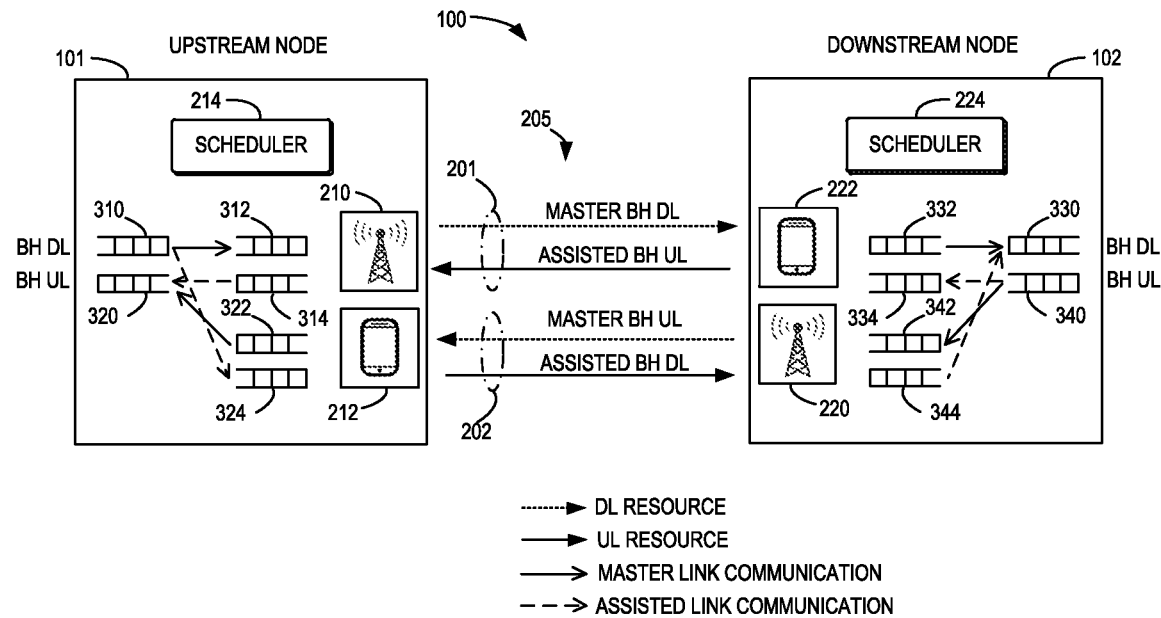

FIG. 3C shows a third mode (Mode 3) for the union resource scheduling between the nodes 101 and 102. In this mode, the upstream node 101 acts as a master node for BH DL communication, but is a slave node for BH UL communication. The downstream node 102 acts as a master node for BH UL communication, but is a slave node for BH DL communication. The resource scheduling in the upstream and downstream nodes 101 and 102 are symmetrical in this mode.

For BH DL communication, the upstream node 101 (for example, its scheduler 214) allocates its own access downlink resources as a set of resources for BH DL communication first. The set of the allocated resources may be indicated to the downstream node 102 via an indication. Thus, over the link 201 controlled by the upstream node 101, a BH DL in a direction from the upstream node 101 to the downstream node 102 may be referred to as a master BH DL, which has the downlink resources scheduled by the upstream node 101 for BH DL communication.

In operation, the upstream node 101 determines whether its scheduled downlink resources are sufficient for BH DL communication. If the upstream node 101 determines that its scheduled downlink resources are insufficient for BH DL communication (which means that a resource shortage happens), the upstream node 101 may transmit a request for resource allocation to the downstream node 102, to request uplink resources for BH DL communication. Upon receiving the request, the downstream node 102 (for example, its scheduler 224) may allocate a set of resources including the requested uplink resources and transmit an indication of the set of allocated resources to the upstream node 101. The set of uplink resources scheduled by the downstream node 102 may be used as assisted resources for BH DL communication over the link 202. A BH DL in a direction from the upstream node 101 to the downstream node 102 over the link 202 may be referred to as an assisted BH DL, which has the uplink resources scheduled by the downstream node 102 for BH DL communication.

For BH UL communication, the downstream node 102 (for example, its scheduler 224) allocates its own access downlink resources as a set of resources for BH UL communication first. The set of the allocated resources may be indicated to the upstream node 101 via an indication. Thus, over the link 202 controlled by the downstream node 102, a BH UL in a direction from the downstream node 102 to the upstream node 101 may be referred to as a master BH UL, which has the downlink resource scheduled by the downstream node 102 for BH UL communication.

The downstream node 102 determines whether its scheduled downlink resources are sufficient for BH UL communication. If the downstream node 102 determines that its scheduled downlink resources are insufficient for BH UL communication (which means that a resource shortage happens), the downstream node 102 may transmit a request for resource allocation to the upstream node 101, to request uplink resources for BH DL communication. Upon receiving the request, the upstream node 101 (for example, its scheduler 214) may allocate a set of resources including the requested uplink resources and transmit an indication of the set of allocated resources to the downstream node 102. The set of uplink resources scheduled by the upstream node 101 may be used as assisted resources for BH UL communication over the link 201. A BH UL in a direction from the downstream node 102 to the upstream node 101 may be referred to as an assisted BH UL, which has the uplink resources scheduled by the upstream node 101 for BH UL communication.

According to the embodiments of FIG. 3C, the master BH DL over the link 201 and the master BH UL over the link 202 may be collectively referred to as a master link, while the assisted BH UL over the link 201 and the assisted BH DL 202 may be collectively referred to as an assisted link. FIG. 3C further shows how backhaul traffic buffered in BH DL buffers and BH UL buffers of the upstream node 101 and the downstream node 102 can be communicated using the master link and the assisted link. Similar as the examples shown in FIGS. 3A and 3B, BH DL traffic in the upstream node 101 is first transmitted to the downstream node 102 using the master resources over the master BH DL in the link 201. In case of the assisted resources are scheduled by the downstream node 102, part or all of the BH DL traffic may be scheduled to be transmitted using the assisted resources over the assisted BH DL in the link 202. BH DL traffic in the downstream node 102 is first transmitted to the upstream node 101 using the master resources over the master BH UL in the link 202. In case of the assisted resources are scheduled by the upstream node 101, part or all of the BH UL traffic may be scheduled to be transmitted using the assisted resource over the assisted BH UL in the link 201.

Figure 3D:
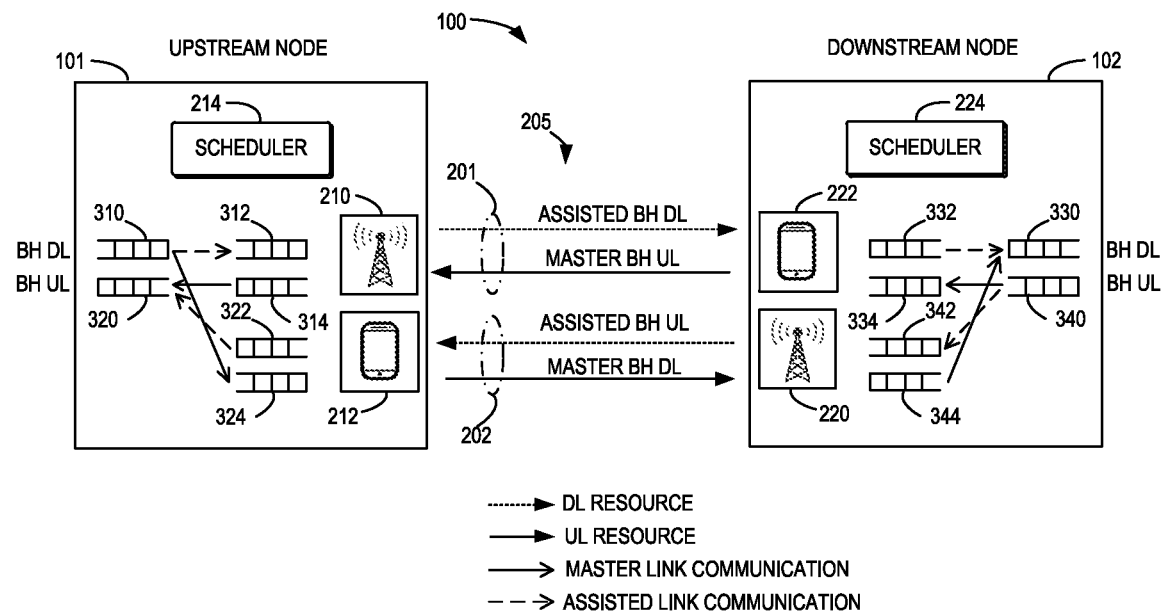

FIG. 3D shows a fourth mode (Mode 4) for the union resource scheduling between the nodes 101 and 102. In this mode, the upstream node 101 acts as a master node for BH UL communication, but is a slave node for BH DL communication. The downstream node 102 acts as a master node for BH DL communication, but is a slave node for BH UL communication. The resource scheduling in the upstream and downstream nodes 101 and 102 are symmetrical in this mode.

For BH UL communication, the upstream node 101 (for example, its scheduler 214) allocates its own access uplink resources as a set of resources for BH UL communication first. The set of the allocated resources may be indicated to the downstream node 102 via an indication. Thus, over the link 201 controlled by the upstream node 101, a BH UL in a direction from the downstream node 102 to the upstream node 101 may be referred to as a master BH UL, which has the uplink resources scheduled by the upstream node 101 for BH UL communication.

In operation, the upstream node 101 determines whether its scheduled uplink resources are sufficient for BH UL communication. If the upstream node 101 determines that its scheduled uplink resources are insufficient for BH UL communication (which means that a resource shortage happens), the upstream node 101 may transmit a request for resource allocation to the downstream node 102, to request downlink resources for BH DL communication. Upon receiving the request, the downstream node 102 (for example, its scheduler 224) may allocate a set of resources including the requested downlink resources and transmit an indication of the set of allocated resources to the upstream node 101. The set of downlink resources scheduled by the downstream node 102 may be used as assisted resources for BH UL communication over the link 202. A BH UL in a direction from the downstream node 102 to the upstream node 101 over the link 202 may be referred to as an assisted BH UL, which has the downlink resources scheduled by the downstream node 102 for BH UL communication.

For BH DL communication, the downstream node 102 (for example, its scheduler 224) allocates its own access uplink resources as a set of resources for BH DL communication first. The set of the allocated resources may be indicated to the upstream node 101 via an indication. Thus, over the link 202 controlled by the downstream node 102, a BH DL in a direction from the upstream node 101 to the downstream node 102 may be referred to as a master BH DL, which has the uplink resources scheduled by the downstream node 102 for BH DL communication.

The downstream node 102 determines whether its scheduled uplink resources are sufficient for BH DL communication. If the downstream node 102 determines that its scheduled uplink resources are BH DL communication (which means that a resource shortage happens), the downstream node 102 may transmit a request for resource allocation to the upstream node 101, to request downlink resources for BH DL communication. Upon receiving the request, the upstream node 101 (for example, its scheduler 214) may allocate a set of resources including the downlink resources and transmit an indication of the set of allocated resources to the downstream node 102. The set of downlink resources scheduled by the upstream node 101 may be used as assisted resources for BH DL communication over the link 201. A BH DL in a direction from the upstream node 101 to the downstream node 102 may be referred to as an assisted BH DL, which has the downlink resources scheduled by the upstream node 101 for BH DL communication.

According to the embodiments of FIG. 3D, the master BH DL over the link 202 and the master BH UL over the link 201 may be collectively referred to as a master link, while the assisted BH UL over the link 202 and the assisted BH DL over the link 201 may be collectively referred to as an assisted link. FIG. 3D further shows how backhaul traffic buffered in BH DL buffers and BH UL buffers of the upstream node 101 and the downstream node 102 can be communicated using the master link and the assisted link. Similar as the examples shown in FIGS. 3A and 3B, BH DL traffic in the upstream node 101 is first transmitted to the downstream node 102 using the master resources over the master BH DL in the link 202. In case of the assisted resources are scheduled by the upstream node 101, part or all of the BH DL traffic may be scheduled to be transmitted using the assisted resources over the assisted BH DL in the link 201. BH DL traffic in the downstream node 102 is first transmitted to the upstream node 101 using the master resources over the master BH UL in the link 201. In case of the assisted resources are scheduled by the downstream node 102, part or all of the BH UL traffic may be scheduled to be transmitted using the assisted resource over the assisted BH UL in the link 202.

Four different modes for the union resource scheduling are described above with reference to the examples shown in FIGS. 3A to 3D. In the above examples, the two network nodes (or their schedulers) collaborate to complete the resource scheduling, but one of them will master/dominate the backhaul transmission, for example, the downstream node 102 in Mode 1, the upstream node 101 in Mode 2, the upstream node 101 for BH DL communication in Mode 3, the downstream node 102 for BH UL communication in Mode 3, the upstream node 101 for BH UL communication in Mode 4, the downstream node 102 for BH DL communication in Mode 4. In some embodiments, one of the four modes may be pre-configured to the upstream and downstream nodes 101 and 102 for use in their backhaul communication. The mode used by the upstream and downstream nodes 101 and 102 may change if required.

As mentioned above, when backhaul resources are allocated in both sides, backhaul traffic may also be forwarded to different backhaul links (the master and/or assisted links) according to buffer status as shown in FIGS. 3A to 3D. In addition to the buffer status, backhaul links (the master and/or assisted links) may be selected based on different source/destination addressees of the traffic, different types of services from which the traffic is originated, and the like. In some embodiments, when the master node requests the slave node for resource allocation, the master node may indicate to the slave node how much resources are required for backhaul uplink and/or downlink communication. The master node may also indicate to the slave node how to route the traffic between the master backhaul link and the assisted backhaul link. In both the upstream and downstream node, backhaul traffic may be routed to one or both of the master backhaul link and the assisted backhaul link and then aggregated from the links at the receiving side.

In Mode 1 shown in FIG. 3A, the radio access DL and UL of the downstream node are sufficiently utilized for the BH UL and DL communication, while the radio access DL and UL resources of the upstream node can also be scheduled for use in case of resource shortage in BH communication. In Mode 2 shown in FIG. 3B, the radio access DL and UL of the upstream node are sufficiently utilized for the BH UL and DL communication, while the radio access DL and UL resources of the downstream node can also be scheduled for use in case of resource shortage in BH communication.

In Mode 3 shown in FIG. 3C, both the BH UL and DL communication can utilize radio access DL resources of both the upstream and downstream nodes as more as possible, while the radio access UL resources are scheduled for use in case of resource shortage in BH communication. Mode 3 can prioritize the downlink resources over the uplink resources. As not have bandwidth request procedures to begin the traffic communication, this mode can implement low latency backhaul transmission. In Mode 4 shown in FIG. 3D, both BH UL and DL communication can utilize radio access UL resources of both the upstream and downstream nodes as more as possible, while the radio access DL resources are scheduled for use in case of resource shortage in BH communication. Mode 4 can prioritize the uplink resources over the downlink resources. As communication on the uplink resources need bandwidth request procedures, this mode is suitable for non-latency-sensitive backhaul communication.

Based on the above modes for union resource scheduling, both sides of the dual backhaul link can cooperatively complete the control and scheduling for backhaul communication in a flexible manner, including the backhaul direction, resource allocation between two nodes, resource allocation between backhaul and access communication, traffic scheduling between master and assisted backhaul links, and backhaul link configuration for different types of services. Some example scenarios of the flexible resource allocation will be discussed below.

Figure 4:
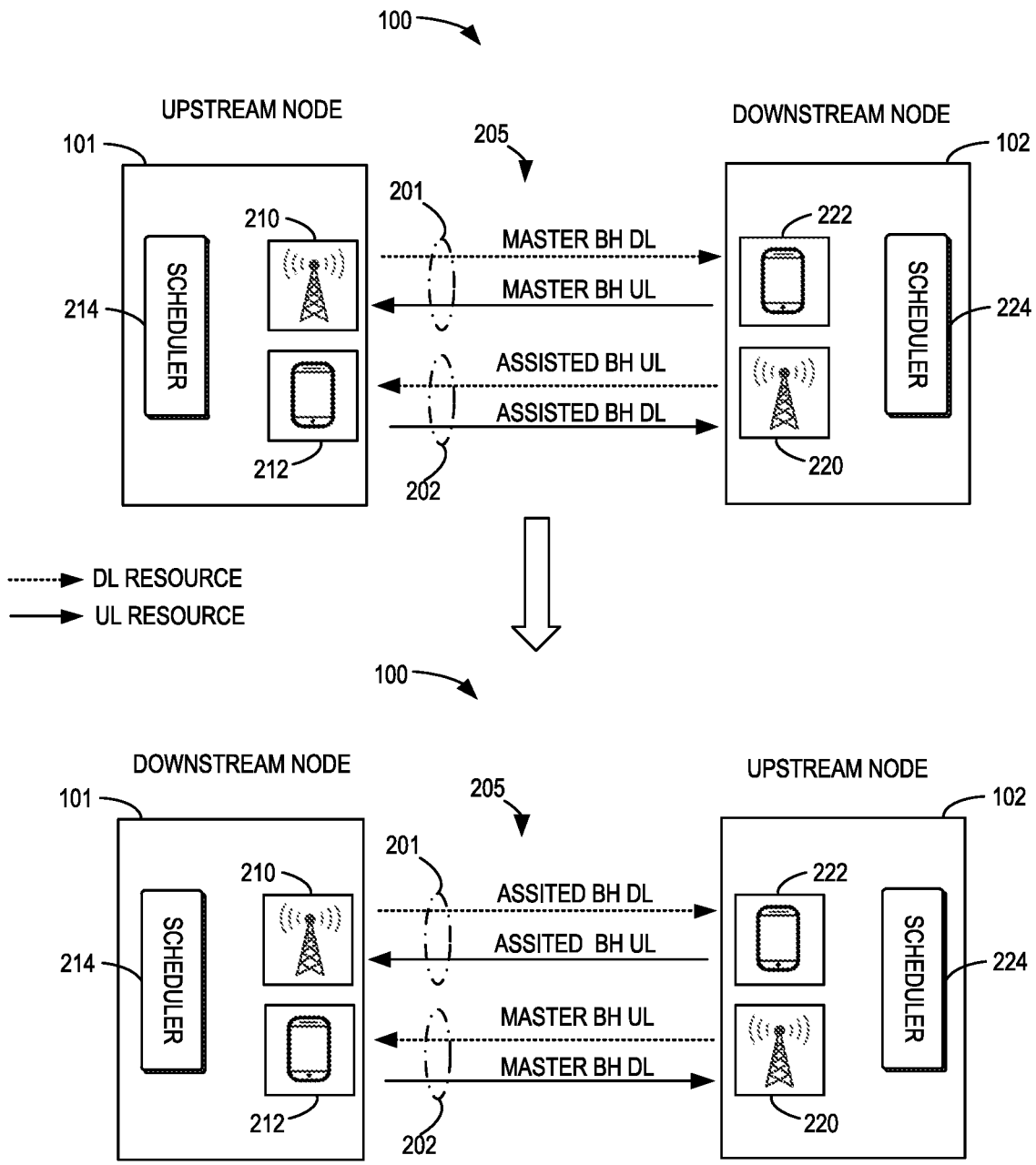
FIG. 4 illustrates an example of changing the mode for resource scheduling in the wireless communication network of FIG. 2 according to embodiments of the present disclosure.

In some embodiments, backhaul communication between the network nodes may be easily changed based on the resource scheduling mechanism of the present disclosure. The direction adjustment will not require re-establishing a new backhaul link. For example, as shown in FIG. 4, at an initial stage, the nodes 101 and 102 are operating in Mode 2 for the union resource scheduling as described above with reference to FIG. 3B. That is, in this mode, the node 101 is a master node in upstream for backhaul communication while the node 102 is a slave node. In some cases, for example, due to the backhaul link block or backhaul link quality degrade, the backhaul has to reroute to establish a new path. That will result in adjustment of the backhaul direction. In this solution, two nodes 101 and 102 can negotiate with each other such that the upstream node 101 becomes a downstream node and the node 102 becomes an upstream node. If the two nodes still work in Mode 2, the node 102 will become a master node and the node 101 becomes a slave node.

It would be appreciated that Mode 2 is illustrated in FIG. 4 as an example only. In any of the above four modes, the nodes 101 and 102 can deal with the change of the backhaul direction by negotiating with each other on the modes and the roles in the resources scheduling. In some embodiments, the nodes 101 and/or 102 may allocate their uplink and/or downlink resources based on a latency requirement for the backhaul communication, so as to satisfy the latency requirement.

In some embodiments, the nodes 101 and/or 102 may allocate their uplink and/or downlink resources based on the conditions of the access communication and/or the backhaul communication. Specifically, no matter scheduling the resources as a master node or as a slave node, each of the node 101 and/or 102 may allocate the resources based at least one of the following: uplink and/or downlink traffic loads between the terminal device 111 and the network node 101 in the access communication, uplink and/or downlink load between the terminal device 112 and the network node 102 in the access communication, uplink and/or downlink traffic loads between the nodes 101 and 102. Depending on these factors, the nodes 101 and/or 102 may flexibly allocate their resources among the access communication and the backhaul communication.

Some examples of resource allocation depending on the traffic loads in the access communication and/or the backhaul communication are illustrated in FIGS. 5A to 5E. In the examples of FIGS. 5A to 5E, for convenience of illustration and brevity, the nodes 101 and 102 are simplified, with the node 101 being an upstream node and the node 102 being a downstream node. However, it would be appreciated that in a backhaul path, the network node 101 may also be an upstream node, and the network node 102 may then be the upstream node. In addition, in the examples shown in FIGS. 5B to 5E, the nodes 101 and 102 may operate in any of the above four modes for union resource scheduling.

Figure 5A:
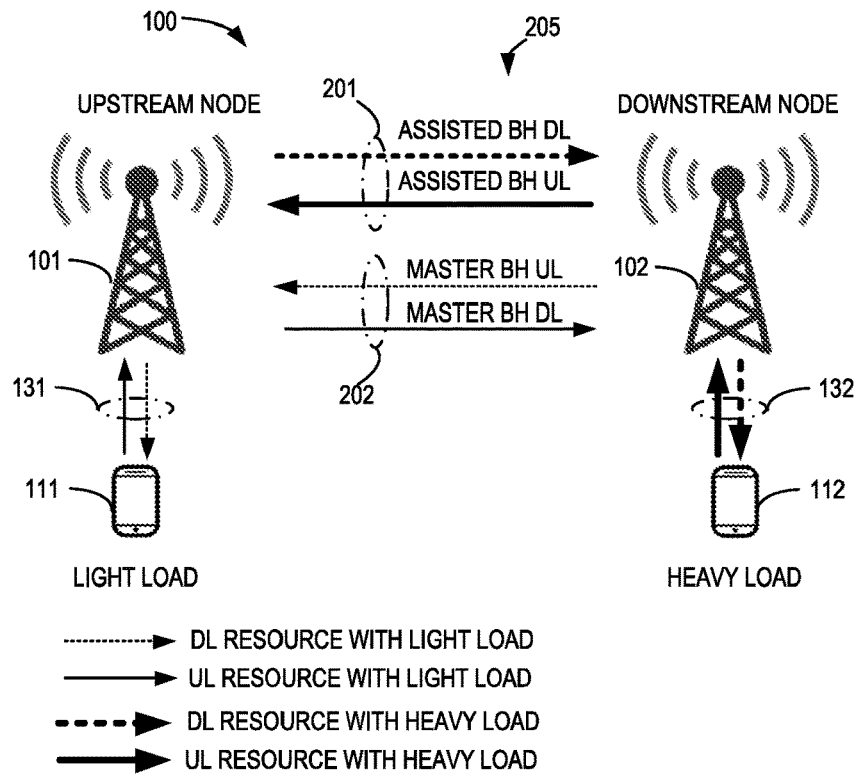
FIGS. 5A-5E illustrate some examples of resource scheduling depending on the traffic loads according to embodiments of the present disclosure.

FIG. 5A shows that the union resource scheduling can implement inter-node resource coordination in a certain mode. The nodes 101 and 102 operate in Mode 1 for the union resource scheduling in this figure. As discussed above, in Mode 1, the BH UL and BH DL over the link 202 controlled by the downstream node 102 operate as a master BH DL and a master BH UL, respectively. The BH UL and BH DL over the link 201 controlled by the upstream node 101 operate as an assisted BH DL and an assisted BH UL, respectively.

In operation, when the downstream node 102 detects heavy traffic load (in including both UL and DL) in its access communication with the terminal device 112 over the access link 132. In this case, the downstream node 102 may request the upstream node 101 to allocate more resources as assisted resources for backhaul communication. Then more backhaul traffic may be scheduled to be communicated over the assisted link 201. In this way, the downstream node 102 with heavy access traffic load may need to allocate a little resource for the backhaul communication over the master link 202 and leave more resources for access communication.

It would be appreciated that FIG. 5A is illustrated as an example only. The nodes 101 and 102 operating in any mode of union resource scheduling each can request the other node to allocate more uplink and/or downlink resources to support the backhaul communication so as to alleviate the heavy traffic load problem in their access communication. FIGS.

5B to 5E show some other examples where union resource scheduling can enable flexible resource allocation between backhaul communication and access communication in both uplink and downlink. For example, when one of the nodes suffers from heavy downlink/uplink access traffic load and need more downlink/uplink resources for the access communication, the two nodes can coordinate resource allocation with each other.

Figure 5B:
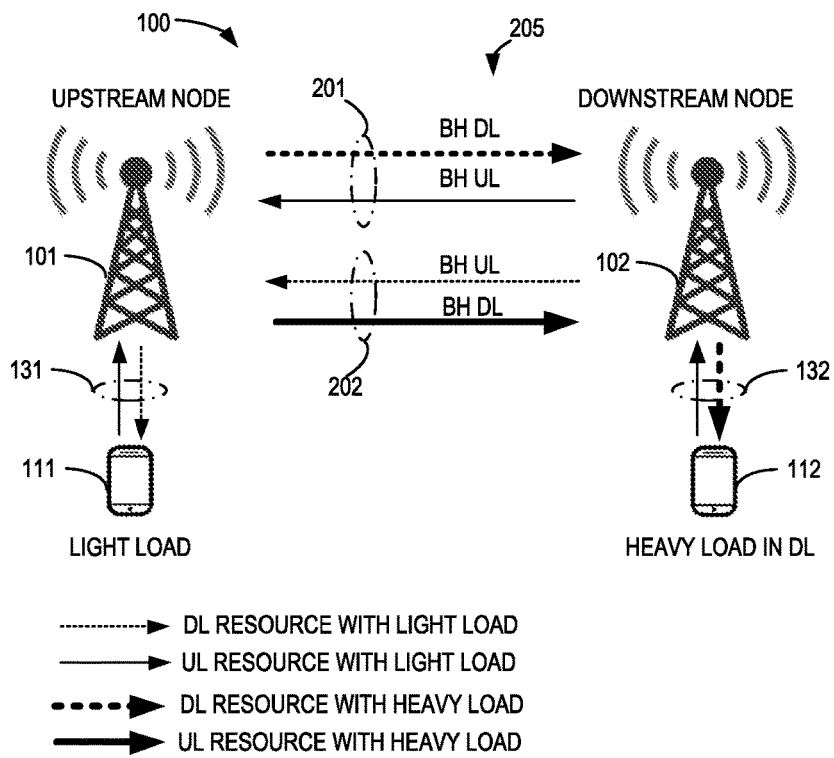

In the example of FIG. 5B, the downstream node 102 suffers from heavy downlink traffic load in the access communication, the upstream node 101 may allocate more downlink resources and the downstream node 102 may allocate more uplink resources for backhaul downlink communication. Thus, the downstream node 102 may have more downlink resources left to satisfy the requirement of downlink access communication at the downstream node 102. Moreover, it is possible to maintain the quality requirement for the backhaul uplink and downlink communication.

Figure 5C:
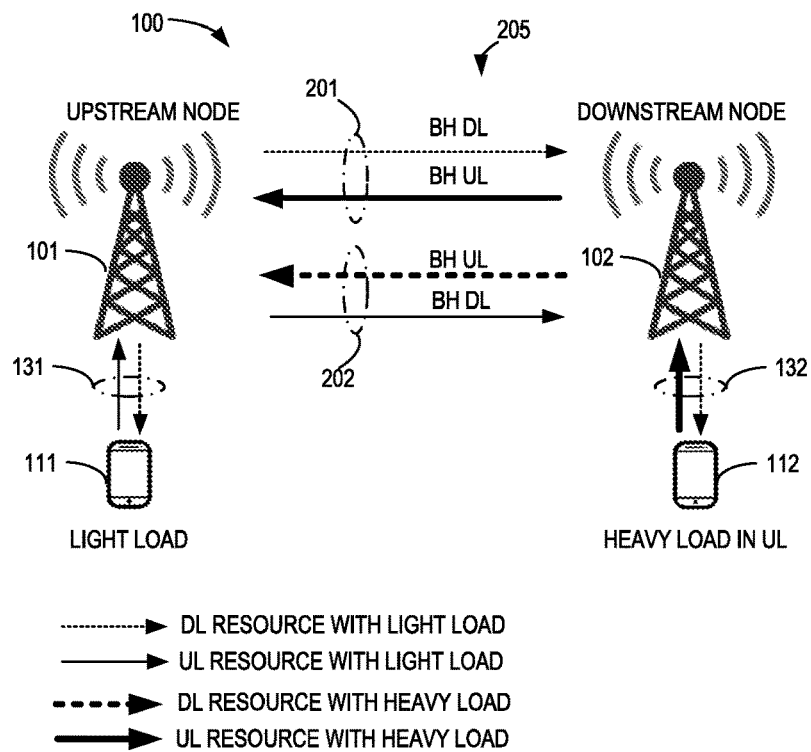

In the example of FIG. 5C, the downstream node 102 suffers from heavy uplink traffic load in the access communication, the upstream node 101 may allocate more uplink resources and the downstream node 102 may allocate more downlink resources for backhaul uplink communication. Thus, the downstream node 102 may have more uplink resources left to satisfy the requirement of uplink access communication at the downstream node 102. Moreover, it is possible to maintain the quality requirement for the backhaul uplink and downlink communication.

Figure 5D:
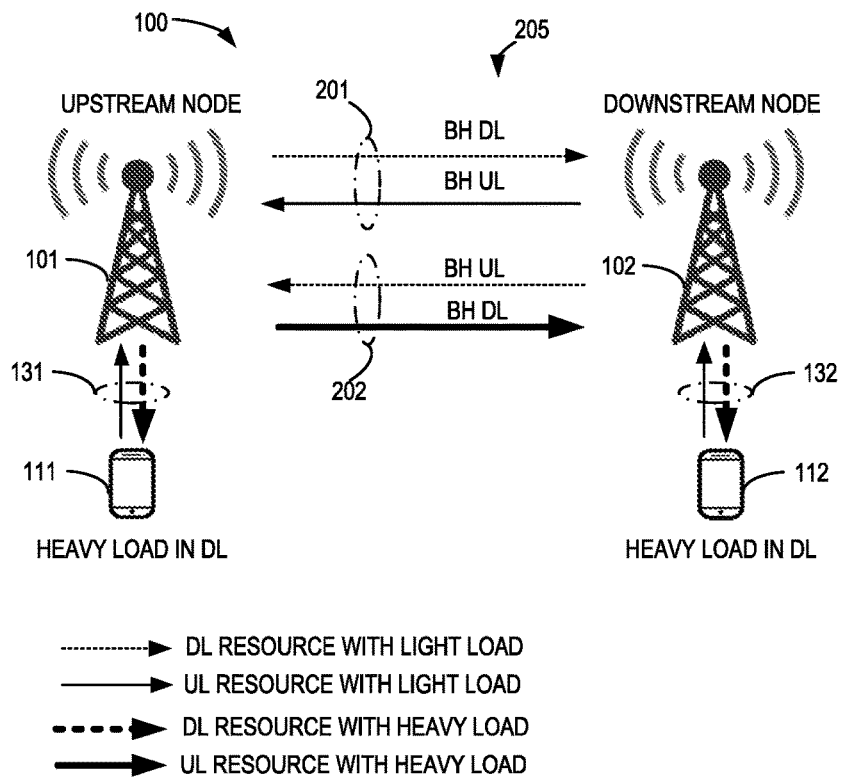
Figure 5E:
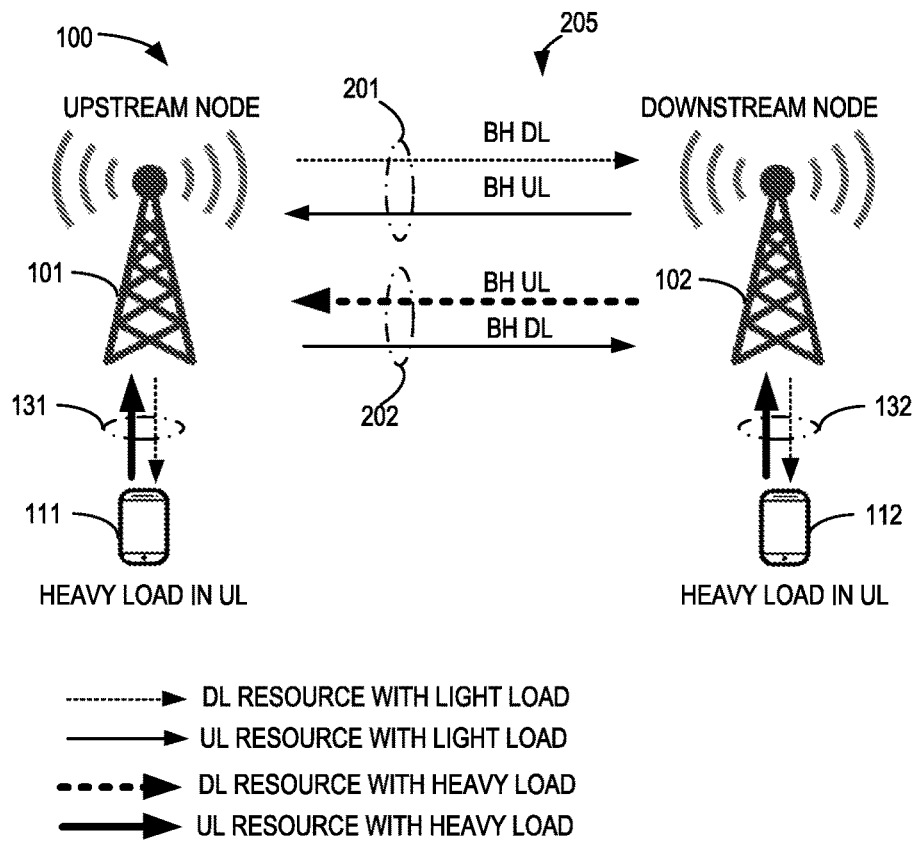

In the example of FIG. 5D, both the upstream node 101 and the downstream node 102 suffer from heavy downlink traffic load in the access communication, the upstream node 101 is not able to allocate sufficient downlink resources for backhaul downlink communication, but the downstream node 102 can allocate more uplink resources for backhaul downlink communication. In a symmetrical example shown in FIG. 5E, both the upstream node 101 and the downstream node 102 suffer from heavy uplink traffic load in the access communication, the upstream node 101 is not able to allocate sufficient uplink resources for backhaul uplink communication, but the downstream node 102 can allocate more downlink resources for backhaul uplink communication.

Accordingly, as can be seen from the examples as discussed above, the union resource scheduling can be flexibly configured to satisfy traffic requirement and improve system resource efficiency. It would be appreciated that only limited examples are provided above to facilitate understanding of flexibility of the union resource scheduling according to the access/backhaul uplink/downlink traffic loads occurred in the communication network.

Figure 6:
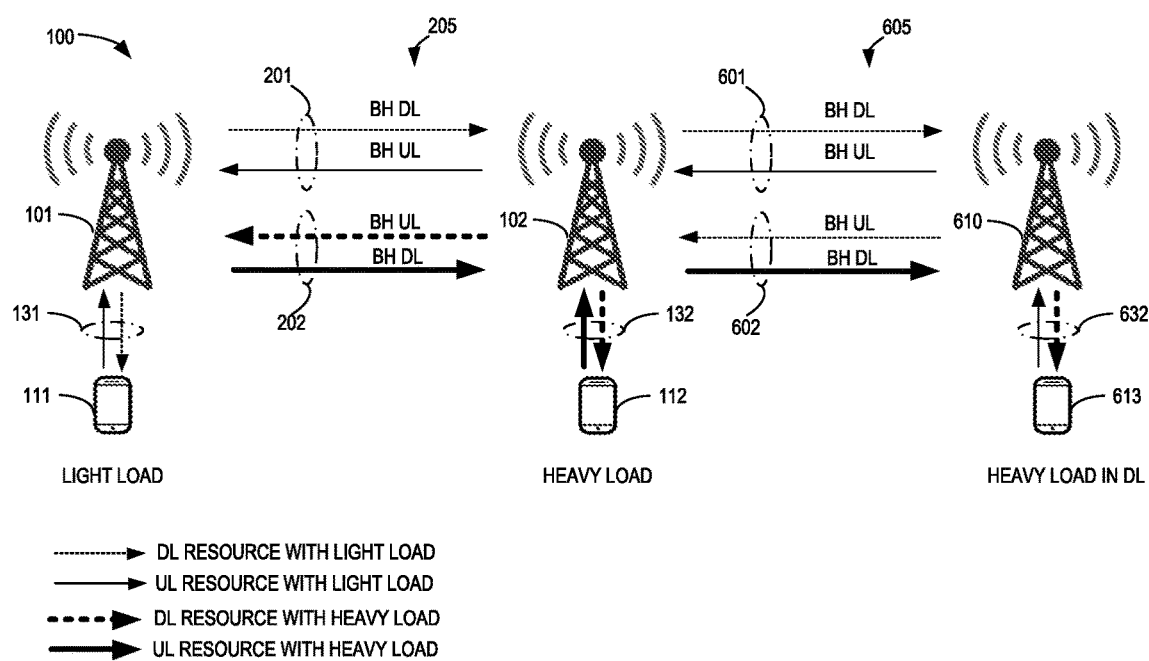
FIG. 6 illustrates an example of resource scheduling in a multi-hop backhaul path according to embodiments of the present disclosure.

In some cases of a multi-hop backhaul path, a network node may communicate with a further network node as a downstream node and may communicate with a second further network node as an upstream node. The union resource scheduling of the present disclosure can also support flexible resource allocation in these cases. FIG. 6 illustrates a scenario showing a 2-hop backhaul path. In this example, in addition to the network nodes 101 and 102, the communication network 100 further include a network node 610 and a terminal device 613 served by the network node 610. The network node 610 may have the same or similar functionalities in backhaul communication as the network nodes 101 and 102, and thus can establish a dual backhaul link with other nodes. It is assumed that the network node 101 is an upstream node with respect to the network node 102, the network node 102 is an downstream node with respect to the network node 101 and is an upstream node with respect to the network node 610, and the network node 610 is a downstream node with respect to the network node 102. In such case, the network node 102 may thus be referred to as a relay node.

A dual backhaul link 605, which is similar as the dual backhaul link 205, may be established between the network node 102 and the network node 610, consisting of a link 601 controlled by the network node 102 and a link 602 controlled by the network node 610. In this example, the network node 102 may allocate the resources for the backhaul communication with the network node 101 over the link 202 and for the backhaul communication with the network node 610 over the link 601. In addition to the factors of traffic loads discussed above or as an alternative, traffic loads in backhaul downlink and/or uplink communication between the network nodes 102 and 610, and/or traffic loads in access downlink and/or uplink communication between the network node 610 and the terminal device 613 may also have a direct impact on the resource allocation at the network node 102 and/or an indirect impact on the resource allocation at the network node 101 (via the impact on the resource allocation of the node 102).

As an example, in FIG. 6, the network node 102 suffers from heavy uplink and downlink access traffic loads and the network node 610 suffers from heavy downlink access traffic loads, the network node 610 can allocate sufficient uplink resources for the backhaul downlink communication with the network node 102, and the network node 101 can allocate sufficient downlink and uplink resources for both backhaul downlink and uplink communication. In this way, most of the access recourse of the network node 102 can be left for its access communication. Apparently, in multi-hop backhaul communication, union multi-hop resource scheduling is also possible and can implement flexible resource coordination to satisfy many application cases.

In some embodiments, the resource allocation at the network nodes 101 and/or 102 may be determined based on the types of network services supported by the network nodes, which will be described in detail below. Generally, depending on the network deployment, the communication network 100 may be divided into a plurality of logic slices (or network slices), each configured to a different type of network service. Such communication network 100 may be referred to as a multi-slice network. As used herein, a logic slice or a network slice generally refers to a collection of logical network functions that support communication service requirements of one or more cases. Network slicing primarily targets a partition of the core network, but it is not exclusive to the core network (CN), such that Radio Access Network (RAN) may need specific functionality to support multiple slices, or to support partitioning of resources for different network slices.

Examples of network services in different logic network slices include enhanced Mobile Broadband (eMBB), Ultra-Reliable and Low Latency Communication (URLLC), massive Machine Type Communication (mMTC), Network Operations, and the like. Example operating characteristics of eMBB may include macro and small cells, 1 ms Latency (air interface), support for high mobility, etc. Example operating characteristics of URLLC may include low to medium data rates (e.g., 50 kbps-10 Mbps), less than 1 ms air interface latency, 99.999% reliability and availability, low connection establishment latency, 0-500 km/h mobility, etc. Example mMTC operating characteristics may include low data date (e.g., 1-100 kbps), high density of devices (e.g., 200,000/km$^2$), varying latency, low power required (e.g., up to 15 years battery autonomy), asynchronous access, etc. Network operations address various subjects such as Network Slicing, Routing, Migration and Interworking, Energy Saving, etc.

Depending on the configuration of the network nodes and the deployment of the network architecture for the network services, the network nodes 101 and 102 may support one, more, or all of the network services provided in the communication network 100. In some cases, the network nodes 101 and 102 may both support the same or different types of the network services provided in the communication network 100. In some embodiments, one of the network nodes 101 and 102 may be a downstream node in a first network slice but may be an upstream node in a second network slice, the other one of the network nodes 101 and 102 may be an upstream node in the first network slice but may be the downstream node in the second network slice. That is to say, different backhaul traffic for different network services may have inverse backhaul direction over the same dual backhaul link according to their different traffic distributions, their QoS requirements, and/or the capabilities of the anchor nodes.

In the scenario of the multi-slice communication network, the union resource scheduling of the present disclosure can support different backhaul directions for different network slices, and the resource allocation at the network node may be based on the types of network services supported by the network nodes in addition to the various traffic loads as discussed above or as an alternative. In some embodiments, if the network nodes 101 and 102 both support backhaul communication for different types of network services, the resources scheduled by the network nodes 101 and/or 102 from the access resources may be allocated for backhaul communication of any one or more of the different types of network services.

FIGS. 7A to 7D show examples of resource allocation by the network nodes 101 and 102 for different types of network services in the communication network 100. In these examples, URLLC and eMBB are used as examples of the network services. However, it would be appreciated that the communication network 100 may include more types of network services or one or more other types of network services.

Figure 7A:
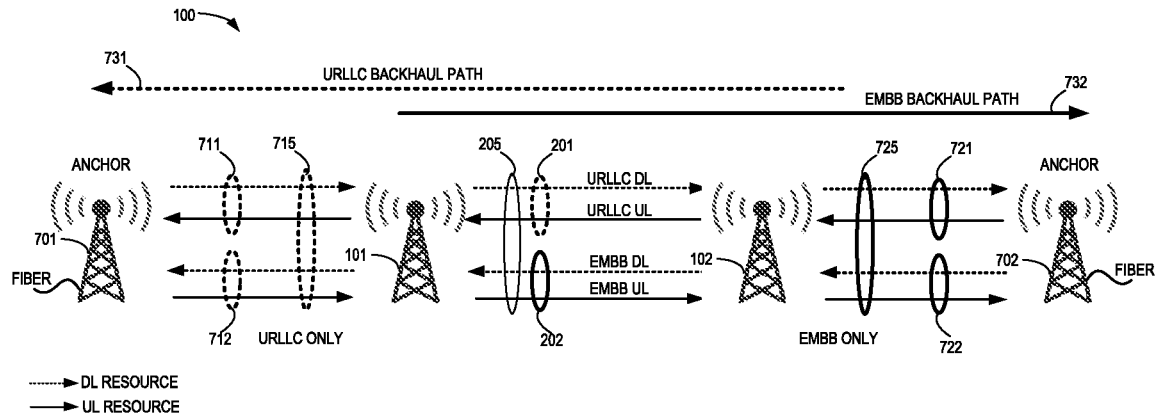
FIGS. 7A-7D illustrate some examples of resource scheduling depending on the network services according to embodiments of the present disclosure.

Reference is first made to FIG. 7A. As shown, in addition to the network nodes 101 and 102, the communication network 100 further comprises additional network nodes 701 and 702. The network node 701 is an anchor node in a logic slice for URLLC and thus is connected to a fiber network. The network node 702 is an anchor node in a logic slice for eMBB and thus is also connected to a fiber network. The network nodes 701 and 702 may have the same or similar functionalities in backhaul communication as the network nodes 101 and 102, and thus can establish a dual backhaul link with other nodes. Although not shown, the network nodes 701 and 702 may serve one or more terminal devices in their coverage.

As shown, a dual backhaul link 715 is established between the network nodes 701 and 101, consisting of a link 711 controlled by the network node 101 and a link 712 controlled by the network node 701. The network nodes 701 and 101 may allocate resources to use in backhaul communication over the dual backhaul link 715 in a similar way as the network nodes 101 and 102. A dual backhaul 725 is established between the network nodes 702 and 102, consisting of a link 721 controlled by the network node 702 and a link 722 controlled by the network node 102. The network nodes 702 and 102 may allocate resources to use in backhaul communication over the dual backhaul link 725 in a similar way as the network nodes 101 and 102.

Due to the network deployment, the network node 701 can only support URLLC and the network node can only support eMBB. The network nodes 101 and 102 can support both URLLC and eMBB. Thus, URLLC backhaul communication between the network nodes 101 and 102 takes the network node 701 as a backhaul anchor node in an URLCC backhaul path 731 of the network slice for this service. eMBB backhaul communication between the network nodes 101 and 102 takes the network node 702 as a backhaul anchor node in an eMBB backhaul path 732 of the network slice for this service.

Due to the location of the anchor nodes 701 and 702, the network nodes 101 and 102 each may have different roles in the URLLC backhaul path 731 and the eMBB backhaul path 732. For example, in the URLLC backhaul path 731, the network node 101 is an upstream node while the network node 102 is a downstream node because the network node 101 is closer to the anchor node 701 as compared with the node 102. In the eMBB backhaul path 732, the network node 102 is an upstream node while the network node 101 is a downstream node because the network node 102 is closer to the anchor node 702 as compared with the node 101. Over the dual backhaul link 205 between the network nodes 101 and 102, URLLC and eMBB have different directions.

In some embodiments of the present disclosure, the network nodes 101 and 102 may negotiate to allocate their access resources for URLLC and/or eMBB over the dual backhaul link 205. In the example of FIG. 7A, after coordination between the network nodes 101 and 102, the link 201 is selected for URLLC and the resources scheduled by the network node 101 over this link 201 may be allocated for URLLC backhaul communication. Over the link 201, a link in a direction from the network node 101 to the network node 102 is referred to as an URLLC BH DL, and a link in a direction from the network node 102 to the network node 101 is referred to as an URLLC BH UL. The link 202 is selected for eMBB and the resources scheduled by the network node 102 over this link 202 may be allocated for eMBB backhaul communication. Over the link 202, a link in a direction from the network node 202 to the network node 201 is referred to as an eMBB BH DL, and a link in a direction from the network node 201 to the network node 202 is referred to as an eMBB BH UL.

Figure 7B:
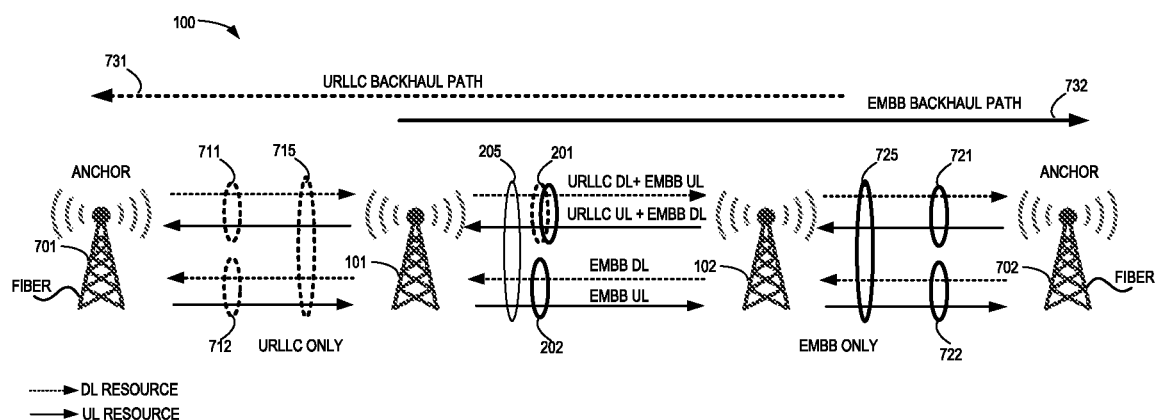

FIG. 7B shows a further example where the dual backhaul link 205 is coordinated in a different manner for URLLC and eMBB. As shown, after coordination between the network nodes 101 and 102, the link 201 is selected for both URLLC and eMBB. Thus, the resources scheduled by the network node 101 over this link 201 may be allocated for backhaul communication of both URLLC and eMBB. The link 202 is selected for eMBB only and the resources scheduled by the network node 102 over this link 202 may be allocated for eMBB backhaul communication.

In this example, eMBB traffic can be transmitted between the network nodes 101 and 102 over both the links 201 and 202, using the resources scheduled for the two links. URLLC traffic can also be transmitted between the network nodes 101 and 102 over the link 201 only, using the resources scheduled for this link. Over the link 201, a link in a direction from the network node 101 to the network node 102 is referred to as an URLLC BH DL in URLLC backhaul communication and referred to as an eMBB BH UL in eMBB backhaul communication. Over the link 201, a link in a direction from the network node 102 to the network node 101 is referred to as an URLLC BH UL in URLLC backhaul communication and referred to as an eMBB BH DL in eMBB backhaul communication. Over the link 202, a link in a direction from the network node 202 to the network node 201 is referred to as an eMBB BH DL, and a link in a direction from the network node 201 to the network node 202 is referred to as an eMBB BH UL.

Figure 7C:
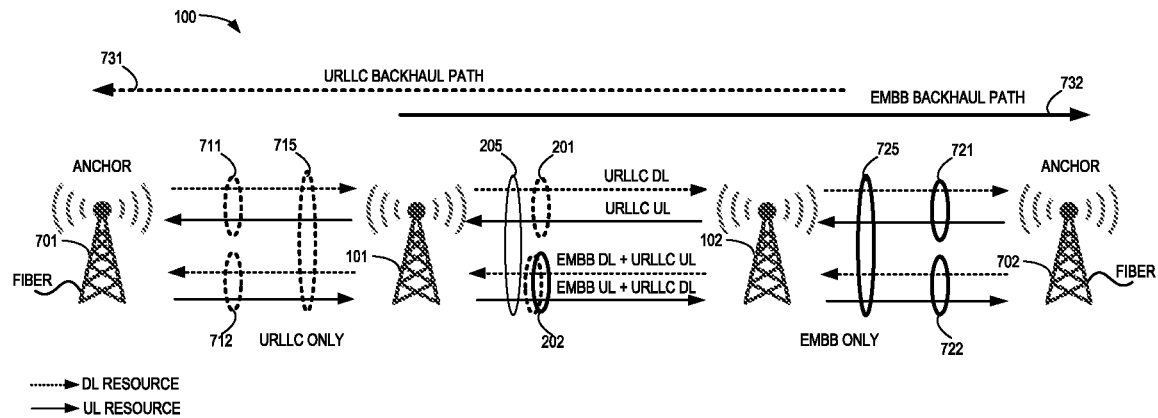

FIG. 7C shows a yet further example where the dual backhaul link 205 is coordinated in a different manner for URLLC and eMBB. As shown, after coordination between the network nodes 101 and 102, the link 202 is selected for both URLLC and eMBB. Thus, the resources scheduled by the network node 102 over this link 202 may be allocated for backhaul communication of both URLLC and eMBB. The link 201 is selected for URLLC only and the resources scheduled by the network node 101 over this link 201 may be allocated for URLLC backhaul communication.

In this example, URLLC traffic can be transmitted between the network nodes 101 and 102 over both the links 201 and 202, using the resources scheduled for the two links. eMBB traffic can also be transmitted between the network nodes 101 and 102 over the link 202 only, using the resources scheduled for this link. Over the link 201, a link in a direction from the network node 101 to the network node 102 is referred to as an URLLC BH DL, and a link in a direction from the network node 102 to the network node 101 is referred to as an URLLC BH UL. Over the link 202, a link in a direction from the network node 102 to the network node 101 is referred to as an eMBB BH DL in eMBB backhaul communication and referred to as an URLLC BH UL in URLLC backhaul communication. Over the link 202, a link in a direction from the network node 101 to the network node 102 is referred to as an eMBB BH UL in eMBB backhaul communication and referred to as an URLLC BH DL in URLLC backhaul communication.

Figure 7D:
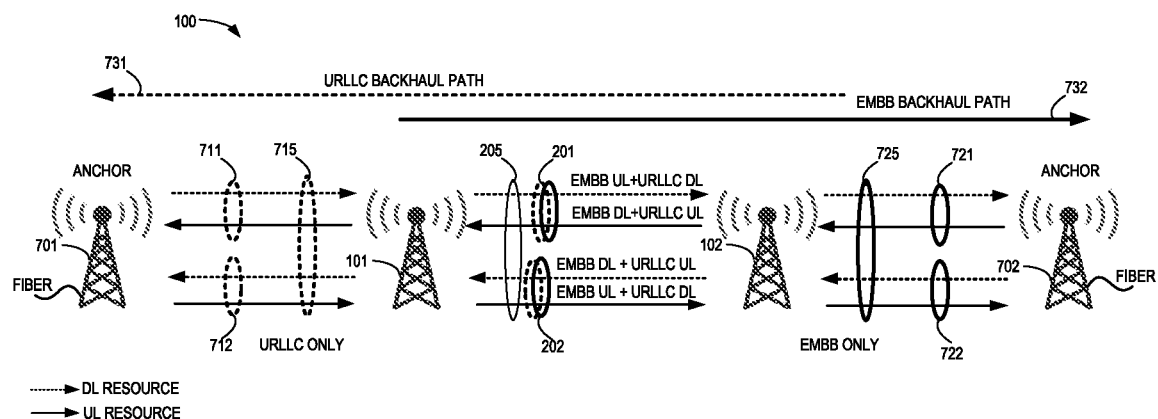

FIG. 7D shows a yet further example where the dual backhaul link 205 is coordinated in a different manner for URLLC and eMBB. As shown, after coordination between the network nodes 101 and 102, each of the links 201 and 202 is selected for both URLLC and eMBB. Thus, the resources scheduled by the network node 101 over the link 201 may be allocated for backhaul communication of both URLLC and eMBB. The resources scheduled by the network node 102 over the link 202 may also be allocated for backhaul communication of both URLLC and eMBB. In this example, URLLC and eMBB traffic can be transmitted between the network nodes 101 and 102 over both the links 201 and 202, using the resources scheduled for the two links. The backhaul directions over the link 201 are the same as in the example of FIG. 7B and the backhaul directions over the link 202 are the same as in the example of FIG. 7C.

It would be appreciated that although the network nodes 101 and 102 are shown to be connected to anchor nodes in different network slices in FIGS. 7A to 7D, in other embodiments, the network nodes 101 and 102 may not be connected to the anchor nodes but also support different types of network services in different backhaul directions.

In some communication networks, such as the 5G NR network, in order to support low latency in the URLLC network slice in access communications, in the access DL direction, URLLC access communication can use a mini-slot (one or several symbols) to preempt some resources for on-going communication of one or more other types of network services, such as eMBB. In the access UL direction, URLLC access communication can be transmitted in a grant-free mode via reserved resource. In some embodiments of the present disclosure, the preempt mode and grant-free mode can also be supported in backhaul communication. In these embodiments, the dual backhaul link can be scheduled to establish new transmission modes for backhaul communication of low latency URLLC. FIGS. 8A to 8D show some examples of the URLLC backhaul communication operating in the preempt mode and the grant-free mode. In the examples of FIGS. 8A to 8D, the network node 101 is an upstream node and the network node 102 is a downstream node for eMBB backhaul communication. The resources scheduled by the network nodes 101 and 102 are allocated for eMBB BH UL and DL communication over the dual backhaul link.

Figure 8A:
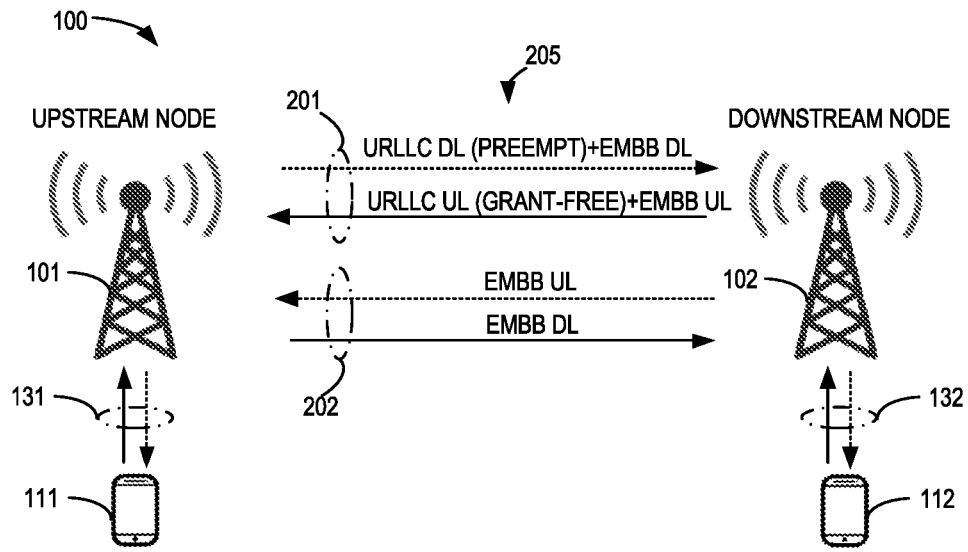
FIGS. 8A-8D illustrate some examples of resource scheduling for different modes of a network service according to embodiments of the present disclosure.

In FIG. 8A, after coordination between the two nodes 101 and 202, URLLC is allocated to the link 201. Some of the resources (for example, downlink resources) allocated by the network node 101 for the link 201 may be used for URLLC BH DL communication in a preempt mode, which mean that URLLC will preempt some of the resources allocated over this link for URLLC BH DL communication. In addition, some of the resources (for example, uplink resources) allocated by the network node 101 for the link 201 may be used for URLLC BH UL communication in a grant-free mode, which means that URLLC will utilize the resources without grant.

Figure 8B:
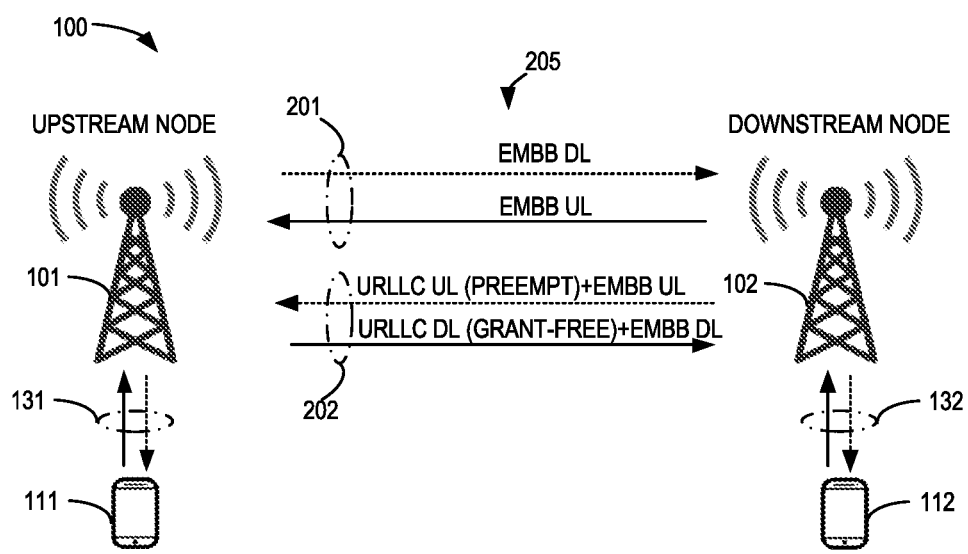

In FIG. 8B, after coordination between the two nodes 101 and 202, URLLC is allocated to the link 202. Some of the resources (for example, downlink resources) allocated by the network node 102 for the link 202 may be used for URLLC BH UL communication in a preempt mode, which mean that URLLC will preempt some of the resources allocated over this link for URLLC BH UL communication. In addition, some of the resources (for example, uplink resources) allocated by the network node 102 for the link 202 may be used for URLLC BH DL communication in a grant-free mode, which means that URLLC will utilize the resources without grant.

Figure 8C:
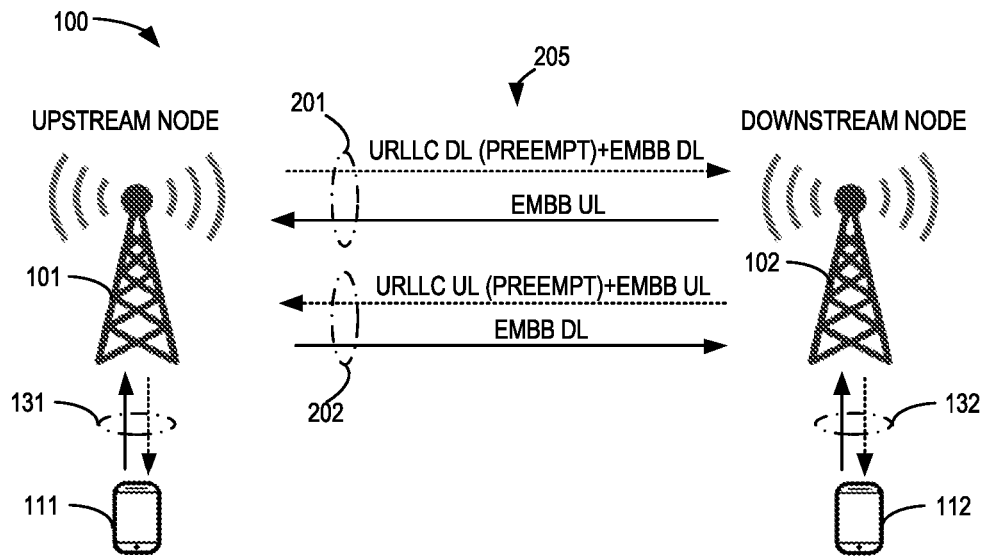
Figure 8D:
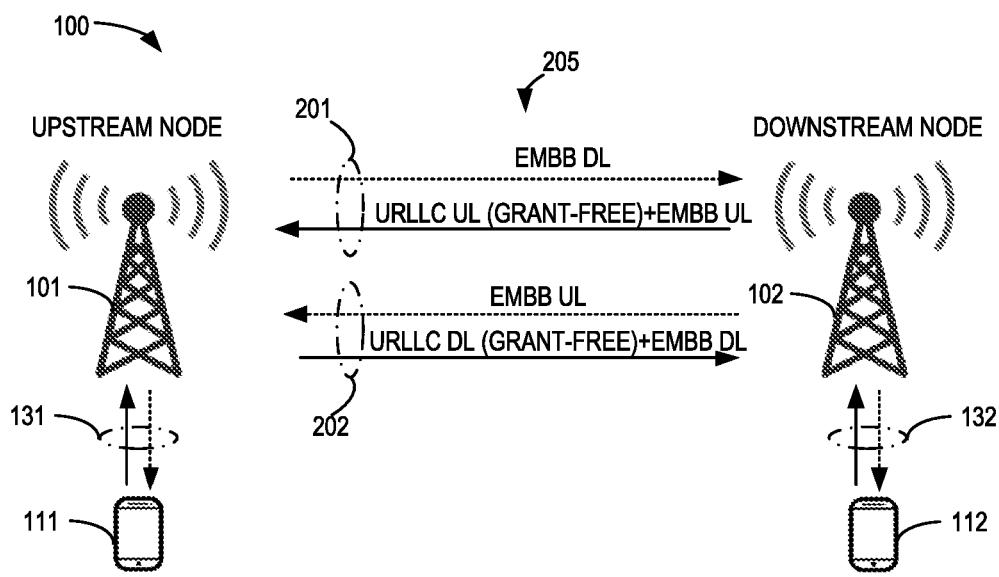

In FIG. 8C, after coordination between the two nodes 101 and 202, URLLC is allocated to the eMBB BH DL in the link 201 and to the eMBB BH UL in the link 202. Some of the resources (for example, downlink resources) allocated by the network node 101 for the link 201 may be used for URLLC BH DL communication in a preempt mode. In addition, some of the resources (for example, uplink resources) allocated by the network node 102 for the link 202 may be used for URLLC BH UL communication in a preempt mode.

In FIG. 8C, after coordination between the two nodes 101 and 202, URLLC is allocated to the eMBB BH UL in the link 201 and to the eMBB BH DL in the link 202. Some of the resources (for example, downlink resources) allocated by the network node 101 for the link 201 may be used for URLLC BH UL communication in a grant-free mode. In addition, some of the resources (for example, uplink resources) allocated by the network node 102 for the link 202 may be used for URLLC BH DL communication in a grant-free mode.

Figure 9:
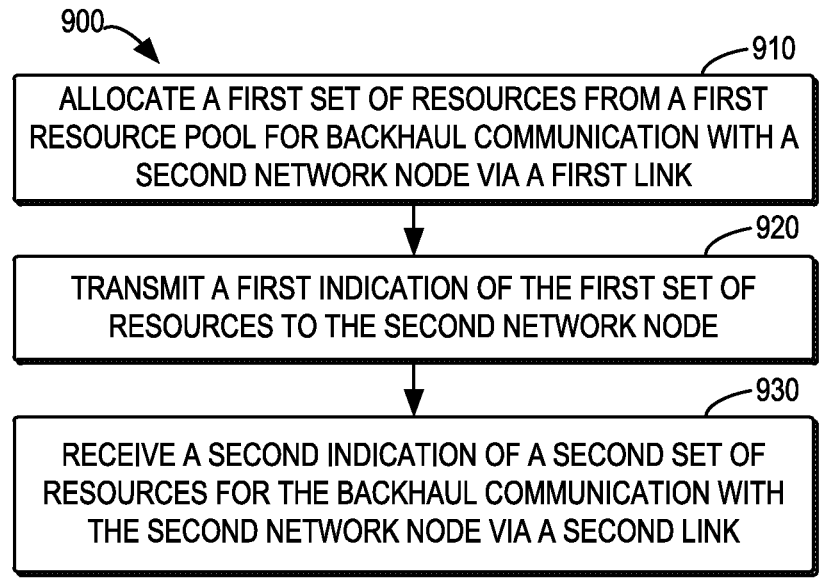
FIG. 9 illustrates a flowchart of a method according to embodiments of the present disclosure.

FIG. 9 illustrates a flowchart of a method 900 according to embodiments of the present disclosure. The method 900 can be implemented by either the network node 101 or the network node 102 in the network 100 of FIG. 2. In embodiments of FIG. 9, a first network node may be one of the network nodes 101 and 102, while a second network node may be the other one of the network nodes 101 and 102. It would be appreciated that the operations of the network nodes 101 and 102 are substantially symmetrical.

At block 910, a first network node allocates a first set of resources from a first resource pool for backhaul communication with a second network node in a network via a first link, the first resource pool comprising uplink and downlink resources shared with a first terminal device served by the first network node. At block 920, the first network node transmits a first indication of the first set of resources to the second network node. At block 930, the first network node receives, from the second network node, a second indication of a second set of resources for the backhaul communication with the second network node via a second link, the second set of resources being selected from a second resource pool, and the second resource pool comprising uplink and downlink resources shared with a second terminal device served by the second network node.

In some embodiments, the first network node is one of a downstream node and an upstream node, and the second network node is the other one of the downstream node and the upstream node, and the first and second sets of resources both comprise uplink and downlink resources for backhaul downlink communication from the upstream node to the downstream node and backhaul uplink communication from the downstream node to the upstream node.

In some embodiments, the first network node is a master node for backhaul communication between the first and second network nodes, and receiving the indication of the second set of resources comprises: in response to determining that the first set of resources are insufficient for the backhaul communication with the second network node, transmitting a request for resource allocation to the second network node; and receiving the second indication of the second set of resources from the second network node.

In some embodiments, the second network node is a master node for backhaul communication between the first and second network nodes, and allocating the first set of resources comprises: receiving a request for resource allocation from the second network node; and in response to receiving the request, allocating the first set of resources.

In some embodiments, the first network node is one of a downstream node and an upstream node, and the second network node is the other one of the downstream node and the upstream node, and the first and second sets of resources both comprise downlink resources for backhaul downlink communication from the upstream node to the downstream node and backhaul uplink communication from the downstream node to the upstream node, or the first and second sets of resources both comprise uplink resources for the backhaul downlink and uplink communication.

In some embodiments, the first network node is a master node for the backhaul downlink communication, the method 900 further comprising: in response to determining that the first set of resources are insufficient for the backhaul downlink communication, transmitting a request for resource allocation to the second network node; and receiving a third indication of a third set of resources from the second network node, the third set of resources being selected from the second resource pool for the backhaul downlink communication.

In some embodiments, the first network node is a master node for the backhaul uplink communication, the method 900 further comprising: in response to determining that the second set of resources are insufficient for the backhaul uplink communication, transmitting a request for resource allocation to the second network node; and receiving a fourth indication of a fourth set of resources from the second network node, the fourth set of resources being selected from the second resource pool for the backhaul uplink communication.

In some embodiments, the first network node is a master node for backhaul communication between the first and second network nodes, the method 900 further comprising: in response to a direction of a backhaul link between the first and second network nodes being changed, indicating the second network node to be the master node.

In some embodiments, allocating the first set of resources comprises: allocating the first set of resources based on at least one of the following: a traffic load between the first terminal device and the first network node, a traffic load between the second terminal device and the second network node, a traffic load between the first network node and the second network node, a traffic load between one of the first and second network nodes and a third network node, the one of the first and second network nodes having backhaul communication with the third network node, a traffic load between the third network node and a third terminal device served by the third network node, and a latency requirement for the backhaul communication between the first and second networks.

In some embodiments, the network comprises a first logic slice for a first type of network service and a second logic slice for a second type of network service.

In some embodiments, the first network node is the upstream node and the second network node is the downstream node in the first logic slice, and the first network node is the downstream node and the second network node is the upstream node in the second logic slice.

In some embodiments, the first set of resources are allocated for backhaul communication of the first type of network service between the first and second network nodes, and the second set of resources are allocated for backhaul communication of the second type of network service between the first and second network nodes.

In some embodiments, the first set of resources are allocated for backhaul communication of the first type of network service between the first and second network node, and the second set of resources are allocated for backhaul communication of the first and second types of network service between the first and second network nodes.

In some embodiments, the first set of resources are allocated for backhaul communication of the first and second types of network service between the first and second network node, and the second set of resources are allocated for backhaul communication of the first and second types of network service between the first and second network nodes.

In some embodiments, the first and second sets of resources are both allocated for backhaul uplink and downlink communication of the first type of network service, a resource in one of the first and second sets of resources allocated for the backhaul downlink communication of the first type of network service being used for backhaul downlink communication of the second type of network service in a preempt mode or in a grant-free mode, and a further resource in the one of the first and second sets of resources allocated for the backhaul uplink communication of the first type of network service being used for backhaul uplink communication of the second type of network service in a grant-free mode or in a preempt mode.

In some embodiments, the first and second sets of resources are both allocated for backhaul uplink and downlink communication of the first type of network service, a resource in one of the first and second sets of resources allocated for the backhaul downlink communication of the first type of network service being used for backhaul downlink communication of the second type of network service in a preempt mode or in a grant-free mode, and a resource in the other one of the first and second sets of resources allocated for the backhaul uplink communication of the first type being used for backhaul uplink communication of the second type of network service in a preempt mode or in a grant-free mode.

In some embodiments, an apparatus capable of performing any of the method 900 (for example, the network node 101 or 102) may comprise means for performing the respective steps of the method 900. The means may be implemented in any suitable form. For example, the means may be implemented in a circuitry or software module.

In some embodiments, the apparatus comprises: means for, at a first network node, allocating a first set of resources from a first resource pool for backhaul communication with a second network node in a network via a first link, the first resource pool comprising uplink and downlink resources shared with a first terminal device served by the first network node; means for transmitting a first indication of the first set of resources to the second network node; and means for receiving, from the second network node, a second indication of a second set of resources for the backhaul communication with the second network node via a second link, the second set of resources being selected from a second resource pool, and the second resource pool comprising uplink and downlink resources shared with a second terminal device served by the second network node.

In some embodiments, the means comprises at least one processor; and at least one memory including computer program code, the at least one memory and computer program code configured to, with the at least one processor, cause the performance of the apparatus.

FIG. 11 illustrates a simplified block diagram of an apparatus 1000 that may be embodied as or comprised in a receiver device, for example, a terminal device 102 or a network device 101 shown in FIG. 1.

The apparatus 1000 comprises at least one processor 1011, such as a data processor (DP) and at least one memory (MEM) 1012 coupled to the processor 1011. The apparatus 1010 may further include a transmitter TX and receiver RX 1013 coupled to the processor 1011, which may be operable to communicatively connect to other apparatuses. The MEM 1012 stores a program or computer program code 1014. The at least one memory 1012 and the computer program code 1014 are configured to, with the at least one processor 1011, cause the apparatus 1000 at least to perform in accordance with embodiments of the present disclosure, for example the method 900.

A combination of the at least one processor 1011 and the at least one MEM 1012 may form processing means 1015 configured to implement various embodiments of the present disclosure.

Various embodiments of the present disclosure may be implemented by computer program executable by the processor 1011, software, firmware, hardware or in a combination thereof.

The MEM 1012 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processor 1011 may be of any type suitable to the local technical environment, and may include one or more of general purpose computers, special purpose computers, microprocessors, digital signal processors (DSPs) and processors based on multicore processor architecture, as non-limiting examples.

Although some of the above descriptions on the GD based signal detection and staged signal detection are made in the context of a wireless communication system shown in FIG. 1, it should not be construed as limiting the spirit and scope of the present disclosure. The principle and concept of the present disclosure may be more generally applicable to other scenarios.

Figure 10:
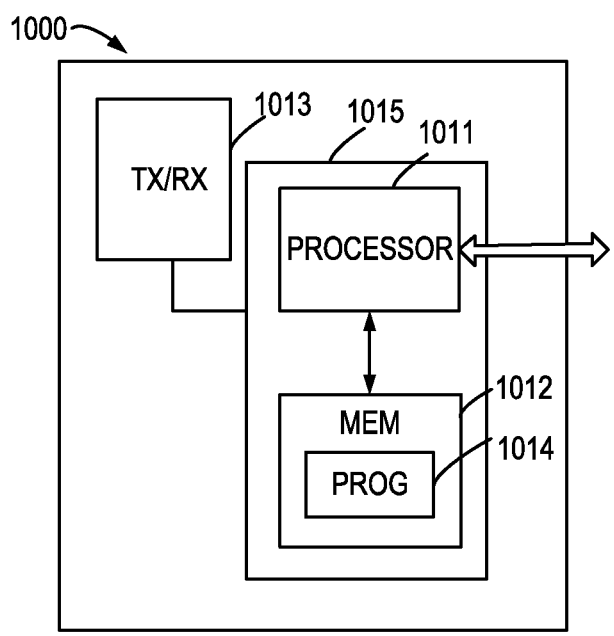
FIG. 10 illustrates a simplified block diagram of a device that is suitable for implementing embodiments of the present disclosure.

In addition, the present disclosure may also provide a carrier containing the computer program as mentioned above (e.g., computer instructions/grogram code 1014 in FIG. 10). The carrier includes a computer readable storage medium and a transmission medium. The computer readable storage medium may include, for example, an optical compact disk or an electronic memory device like a RAM (random access memory), a ROM (read only memory), Flash memory, magnetic tape, CD-ROM, DVD, Blue-ray disc and the like. The transmission medium may include, for example, electrical, optical, radio, acoustical or other form of propagated signals, such as carrier waves, infrared signals, and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 900 as described above with reference to FIG. 9. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

For the purpose of the present disclosure as described herein above, it should be noted that, method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present disclosure is restricted thereto. Rather, it is the intention that all variations and modifications be included which fall within the spirit and scope of the appended claims.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various embodiments of the techniques have been described. In addition to or as an alternative to the above, the following examples are described. The features described in any of the following examples may be utilized with any of the other examples described herein.

What is claimed is:

1. A device, comprising:
at least one processor; and
at least one memory including computer program code;
the at least one memory and the computer program code are configured to, with the at least one processor, cause the device at least to:
at a first network node, allocate a first set of resources from a first resource pool for backhaul communication with a second network node in a network via a first link, the first resource pool comprising uplink and downlink resources shared with a first terminal device served by the first network node;
transmit a first indication of the first set of resources to the second network node; and
receive, from the second network node, a second indication of a second set of resources for the backhaul communication with the second network node via a second link, the second set of resources being selected from a second resource pool, and the second resource pool comprising uplink and downlink resources shared with a second terminal device served by the second network node.

2. The device of claim 1, wherein the first network node comprises one of a downstream node and an upstream node, and the second network node comprises the other one of the downstream node and the upstream node, and
wherein the first and second sets of resources both comprise uplink and downlink resources for backhaul downlink communication from the upstream node to the downstream node and backhaul uplink communication from the downstream node to the upstream node.

3. The device of claim 1, wherein the first network node comprises a master node for backhaul communication between the first and second network nodes, and wherein the at least one memory and the computer program code are further configured to, with the at least one processor, cause the device to:
    in response to determining that the first set of resources are insufficient for the backhaul communication with the second network node, transmit a request for resource allocation to the second network node; and
    receive the second indication of the second set of resources from the second network node.

4. The device of claim 1, wherein the second network node comprises a master node for backhaul communication between the first and second network nodes, and wherein the at least one memory and the computer program code are configured to, with the at least one processor, cause the device to:
    receive a request for resource allocation from the second network node; and
    in response to receiving the request, allocate the first set of resources.

5. The device of claim 1, wherein the first network node comprises one of a downstream node and an upstream node, and the second network node comprises the other one of the downstream node and the upstream node, and
    wherein the first and second sets of resources both comprise downlink resources for backhaul downlink communication from the upstream node to the downstream node and backhaul uplink communication from the downstream node to the upstream node, or the first and second sets of resources both comprise uplink resources for the backhaul downlink and uplink communication.

6. The device of claim 5, wherein the first network node comprises a master node for the backhaul downlink communication, and wherein the at least one memory and the computer program code are configured to, with the at least one processor, cause the device to:
    in response to determining that the first set of resources are insufficient for the backhaul downlink communication, transmit a request for resource allocation to the second network node; and
    receive a third indication of a third set of resources from the second network node, the third set of resources being selected from the second resource pool for the backhaul downlink communication.

7. The device of claim 5, wherein the first network node comprises a master node for the backhaul uplink communication, and wherein the at least one memory and the computer program code are configured to, with the at least one processor, cause the device to:
    in response to determining that the second set of resources are insufficient for the backhaul uplink communication, transmit a request for resource allocation to the second network node; and
    receive a fourth indication of a fourth set of resources from the second network node, the fourth set of resources being selected from the second resource pool for the backhaul uplink communication.

8. The device of claim 1, wherein the first network node comprises a master node for backhaul communication between the first and second network nodes, and wherein the at least one memory and the computer program code are configured to, with the at least one processor, cause the device to:
    in response to a direction of a backhaul link between the first and second network nodes being changed, indicate the second network node to be the master node.

9. The device of claim 1, the at least one memory and the computer program code are configured to, with the at least one processor, cause the device to:
    allocate the first set of resources based on at least one of the following:
        a traffic load between the first terminal device and the first network node,
        a traffic load between the second terminal device and the second network node,
        a traffic load between the first network node and the second network node,
        a traffic load between one of the first and second network nodes and a third network node, the one of the first and second network nodes having backhaul communication with the third network node,
        a traffic load between the third network node and a third terminal device served by the third network node, and
        a latency requirement for the backhaul communication between the first and second networks.

10. The device of claim 1, wherein the network comprises a first logic slice for a first type of network service and a second logic slice for a second type of network service.

11. The device of claim 10, wherein the first network node comprises the upstream node and the second network node comprises the downstream node in the first logic slice, and the first network node comprises the downstream node and the second network node comprises the upstream node in the second logic slice.

12. The device of claim 11, wherein the first set of resources are allocated for backhaul communication of the first type of network service between the first and second network nodes, and the second set of resources are allocated for backhaul communication of the second type of network service between the first and second network nodes.

13. The device of claim 11, wherein the first set of resources are allocated for backhaul communication of the first type of network service between the first and second network node, and the second set of resources are allocated for backhaul communication of the first and second types of network service between the first and second network nodes.

14. The device of claim 11, wherein the first set of resources are allocated for backhaul communication of the first and second types of network service between the first and second network node, and the second set of resources are allocated for backhaul communication of the first and second types of network service between the first and second network nodes.

15. The device of claim 11, wherein the first and second sets of resources are both allocated for backhaul uplink and downlink communication of the first type of network service, a resource in one of the first and second sets of resources allocated for the backhaul downlink communication of the first type of network service being used for backhaul downlink communication of the second type of network service in a preempt mode or in a grant-free mode, and a further resource in the one of the first and second sets of resources allocated for the backhaul uplink communication of the first type of network service being used for backhaul uplink communication of the second type of network service in a grant-free mode or in a preempt mode.

16. The device of claim 11, wherein the first and second sets of resources are both allocated for backhaul uplink and downlink communication of the first type of network service, a resource in one of the first and second sets of resources allocated for the backhaul downlink communication of the first type of network service being used for backhaul downlink communication of the second type of network service in a preempt mode or in a grant-free mode, and a resource in the other one of the first and second sets of resources allocated for the backhaul uplink communication of the first type being used for backhaul uplink communication of the second type of network service in a preempt mode or in a grant-free mode.

17. A method of scheduling resources, comprising:
at a first network node, allocating a first set of resources from a first resource pool for backhaul communication with a second network node in a network via a first link, the first resource pool comprising uplink and downlink resources shared with a first terminal device served by the first network node;
transmitting a first indication of the first set of resources to the second network node; and
receiving, from the second network node, a second indication of a second set of resources for the backhaul communication with the second network node via a second link, the second set of resources being selected from a second resource pool, and the second resource pool comprising uplink and downlink resources shared with a second terminal device served by the second network node.

18. The method of claim 17, wherein the first network node comprises one of a downstream node and an upstream node, and the second network node comprises the other one of the downstream node and the upstream node, and
wherein the first and second sets of resources both comprise uplink and downlink resources for backhaul downlink communication from the upstream node to the downstream node and backhaul uplink communication from the downstream node to the upstream node.

19. The method of claim 17, wherein the first network node comprises a master node for backhaul communication between the first and second network nodes, and receiving the indication of the second set of resources comprises:
in response to determining that the first set of resources are insufficient for the backhaul communication with the second network node, transmitting a request for resource allocation to the second network node; and
receiving the second indication of the second set of resources from the second network node.

20. The method of claim 17, wherein the second network node comprises a master node for backhaul communication between the first and second network nodes, and allocating the first set of resources comprises:
receiving a request for resource allocation from the second network node; and
in response to receiving the request, allocating the first set of resources.

21. The method of claim 17, wherein the first network node comprises one of a downstream node and an upstream node, and the second network node comprises the other one of the downstream node and the upstream node, and
wherein the first and second sets of resources both comprise downlink resources for backhaul downlink communication from the upstream node to the downstream node and backhaul uplink communication from the downstream node to the upstream node, or the first and second sets of resources both comprise uplink resources for the backhaul downlink and uplink communication.

22. The method of claim 21, wherein the first network node comprises a master node for the backhaul downlink communication, the method further comprising:
in response to determining that the first set of resources are insufficient for the backhaul downlink communication, transmitting a request for resource allocation to the second network node; and
receiving a third indication of a third set of resources from the second network node, the third set of resources being selected from the second resource pool for the backhaul downlink communication.

23. The method of claim 22, wherein the first network node comprises a master node for the backhaul uplink communication, the method further comprising:
in response to determining that the second set of resources are insufficient for the backhaul uplink communication, transmitting a request for resource allocation to the second network node; and
receiving a fourth indication of a fourth set of resources from the second network node, the fourth set of resources being selected from the second resource pool for the backhaul uplink communication.

24. The method of claim 17, wherein the first network node comprises a master node for backhaul communication between the first and second network nodes, the method further comprising:
in response to a direction of a backhaul link between the first and second network nodes being changed, indicating the second network node to be the master node.

25. The method of claim 17, wherein allocating the first set of resources comprises:
allocating the first set of resources based on at least one of the following:
a traffic load between the first terminal device and the first network node,
a traffic load between the second terminal device and the second network node,
a traffic load between the first network node and the second network node,
a traffic load between one of the first and second network nodes and a third network node, the one of the first and second network nodes having backhaul communication with the third network node,
a traffic load between the third network node and a third terminal device served by the third network node, and
a latency requirement for the backhaul communication between the first and second networks.

26. The method of claim 17, wherein the network comprises a first logic slice for a first type of network service and a second logic slice for a second type of network service.

27. The method of claim 26, wherein the first network node comprises the upstream node and the second network node comprises the downstream node in the first logic slice, and the first network node comprises the downstream node and the second network node comprises the upstream node in the second logic slice.

28. The method of claim 27, wherein the first set of resources are allocated for backhaul communication of the first type of network service between the first and second network nodes, and the second set of resources are allocated for backhaul communication of the second type of network service between the first and second network nodes.

29. The method of claim 27, wherein the first set of resources are allocated for backhaul communication of the first type of network service between the first and second network node, and the second set of resources are allocated for backhaul communication of the first and second types of network service between the first and second network nodes.

30. The method of claim 27, wherein the first set of resources are allocated for backhaul communication of the first and second types of network service between the first and second network node, and the second set of resources are allocated for backhaul communication of the first and second types of network service between the first and second network nodes.

31. The method of claim 27, wherein the first and second sets of resources are both allocated for backhaul uplink and downlink communication of the first type of network service, a resource in one of the first and second sets of resources allocated for the backhaul downlink communication of the first type of network service being used for backhaul downlink communication of the second type of network service in a preempt mode or in a grant-free mode, and a further resource in the one of the first and second sets of resources allocated for the backhaul uplink communication of the first type of network service being used for backhaul uplink communication of the second type of network service in a grant-free mode or in a preempt mode.

32. The method of claim 27, wherein the first and second sets of resources are both allocated for backhaul uplink and downlink communication of the first type of network service, a resource in one of the first and second sets of resources allocated for the backhaul downlink communication of the first type of network service being used for backhaul downlink communication of the second type of network service in a preempt mode or in a grant-free mode, and a resource in the other one of the first and second sets of resources allocated for the backhaul uplink communication of the first type being used for backhaul uplink communication of the second type of network service in a preempt mode or in a grant-free mode.

33. A non-transitory computer readable medium comprising program instructions for causing an apparatus to perform at least the following:

at a first network node, allocating a first set of resources from a first resource pool for backhaul communication with a second network node in a network via a first link, the first resource pool comprising uplink and downlink resources shared with a first terminal device served by the first network node;

transmitting a first indication of the first set of resources to the second network node; and receiving, from the second network node, a second indication of a second set of resources for the backhaul communication with the second network node via a second link, the second set of resources being selected from a second resource pool, and the second resource pool comprising uplink and downlink resources shared with a second terminal device served by the second network node.

* * * * *